US010035131B2

(12) United States Patent
Pradeep et al.

(10) Patent No.: US 10,035,131 B2
(45) Date of Patent: Jul. 31, 2018

(54) MULTILAYER ORGANIC-TEMPLATED-BOEHMITE-NANOARCHITECTURE FOR WATER PURIFICATION

(71) Applicant: Indian Institute of Technology, Chennai (IN)

(72) Inventors: Thalappil Pradeep, Chennai (IN); Leelavathi Annamalai, Kanjikoval (IN); Mohan Udhaya Sankar, Cuddalore (IN); Amrita Chaudhary, Varanasi (IN); n/a Anshup, Lucknow (IN)

(73) Assignee: Indian Institute of Technology, Chennai (IN)

( * ) Notice: Subject to any disclaimer, the term of this patent is extended or adjusted under 35 U.S.C. 154(b) by 762 days.

(21) Appl. No.: 14/360,449

(22) PCT Filed: Nov. 20, 2012

(86) PCT No.: PCT/IB2012/002885
§ 371 (c)(1),
(2) Date: May 23, 2014

(87) PCT Pub. No.: WO2013/076581
PCT Pub. Date: May 30, 2013

(65) Prior Publication Data
US 2014/0314951 A1    Oct. 23, 2014

(30) Foreign Application Priority Data
Nov. 24, 2011    (IN) ........................... 4062/CHE/2011

(51) Int. Cl.
*B01J 20/32* (2006.01)
*B01J 20/28* (2006.01)
(Continued)

(52) U.S. Cl.
CPC ....... *B01J 20/3293* (2013.01); *B01J 20/2805* (2013.01); *B01J 20/28007* (2013.01);
(Continued)

(58) Field of Classification Search
CPC .............. B01J 20/28007; B01J 20/3236; B01J 20/3289; B82Y 30/00; C02F 1/281;
(Continued)

(56) References Cited

U.S. PATENT DOCUMENTS 2,372,340 A    3/1945 Senyal
2,917,426 A    12/1959 Bugosh
(Continued)

FOREIGN PATENT DOCUMENTS

AE    1238/2012    6/2011
AE    219/2013    9/2011
(Continued)

OTHER PUBLICATIONS

Warsakoon et al. "Deflourination of Drinking Water Using Layered Double Hydroxides". International Conference on Sustainable Built Environment, Kandy. 13-14, pp. 64-66 (2010).*
(Continued)

*Primary Examiner* — Alexander M Weddle
(74) *Attorney, Agent, or Firm* — Ballard Spahr LLP

(57) ABSTRACT

An adsorbent composition comprising a nanoscale shell of metal oxide or hydroxide on an organic-templated-boehmite-nanoarchitecture (OTBN) is provided. The nanoscale shell is prepared by impregnating OTBN with a metal or a non-metal ion, followed by in-situ hydrolysis of the deposited ion on the OTBN surface. The thickness of the shell is less than about 3 nm, which is less than the size of OTBN core. The number of layers of the shell is flexible, thereby leading to a multi-layer nanoscale hybrid composition. The adsorbent composition is capable of removing inorganic anions such as fluoride from water, with an increased adsorption capacity.

19 Claims, 9 Drawing Sheets

(51) Int. Cl.
  *B01J 20/30* (2006.01)
  *C02F 1/28* (2006.01)
  *B82Y 30/00* (2011.01)
  *C02F 101/10* (2006.01)
  *C02F 101/14* (2006.01)
  *C02F 103/06* (2006.01)

(52) U.S. Cl.
  CPC ..... *B01J 20/28042* (2013.01); *B01J 20/3085* (2013.01); *B01J 20/3236* (2013.01); *B01J 20/3289* (2013.01); *B82Y 30/00* (2013.01); *C02F 1/288* (2013.01); *B01J 2220/56* (2013.01); *B01J 2220/58* (2013.01); *C02F 1/281* (2013.01); *C02F 2101/103* (2013.01); *C02F 2101/14* (2013.01); *C02F 2103/06* (2013.01); *C02F 2305/08* (2013.01)

(58) Field of Classification Search
  CPC .. C02F 1/288; C02F 2101/14; C02F 2103/06; C02F 2305/08
  USPC ................ 427/212, 402, 419.1, 419.2, 419.3
  See application file for complete search history.

(56) References Cited

U.S. PATENT DOCUMENTS

| | | | |
|---|---|---|---|
| 3,013,901 A * | 12/1961 | Bugosh | ............... B32B 15/08 264/DIG. 17 |
| 4,151,092 A | 4/1979 | Grimm et al. | |
| 4,250,058 A | 2/1981 | Michalko | |
| 4,684,471 A | 8/1987 | Manojlovic | |
| 4,769,143 A | 9/1988 | Deutsch et al. | |
| 4,918,426 A | 4/1990 | Butts et al. | |
| 5,051,189 A | 9/1991 | Farrah | |
| 5,064,534 A | 11/1991 | Busch et al. | |
| 5,288,399 A | 2/1994 | Schulz | |
| 5,458,766 A | 10/1995 | Ehara et al. | |
| 5,817,263 A | 10/1998 | Taylor | |
| 5,928,506 A | 7/1999 | Bae | |
| 5,981,052 A | 11/1999 | Sugiyama | |
| 5,990,373 A | 11/1999 | Klabunde | |
| 6,048,577 A * | 4/2000 | Garg | .................. B82Y 30/00 106/3 |
| 6,054,056 A | 4/2000 | Maziuk, Jr. et al. | |
| 6,159,363 A | 12/2000 | Collins et al. | |
| 6,193,886 B1 | 2/2001 | Nohren, Jr. | |
| 6,319,487 B1 | 11/2001 | Liu et al. | |
| 6,585,885 B2 | 7/2003 | Larkner et al. | |
| 6,613,236 B1 | 9/2003 | Guess et al. | |
| 6,811,747 B2 | 11/2004 | Silveri | |
| 6,896,813 B1 | 5/2005 | Harthill et al. | |
| 6,908,551 B2 | 6/2005 | King | |
| 6,929,740 B2 | 8/2005 | Hayes | |
| 7,107,838 B2 | 9/2006 | Chai et al. | |
| 7,249,524 B2 | 7/2007 | Williams et al. | |
| 7,264,726 B1 | 9/2007 | Levy | |
| 7,309,429 B2 | 12/2007 | Patil et al. | |
| 7,329,301 B2 | 2/2008 | Chang et al. | |
| 7,396,461 B2 | 7/2008 | Bommi et al. | |
| 7,441,665 B2 | 10/2008 | Bridges et al. | |
| 7,449,030 B2 | 11/2008 | Robson et al. | |
| 7,585,409 B2 | 9/2009 | Bommi et al. | |
| 7,968,493 B2 | 6/2011 | Sreekumaran Nair et al. | |
| 8,932,983 B1 | 1/2015 | Harris et al. | |
| 2003/0019764 A1 | 1/2003 | Baldwin et al. | |
| 2003/0082133 A1 | 5/2003 | Cooper et al. | |
| 2003/0132172 A1 | 7/2003 | Hayes | |
| 2003/0148354 A1 | 8/2003 | Gordon | |
| 2003/0215513 A1 | 11/2003 | Fyhr et al. | |
| 2003/0232718 A1 | 12/2003 | Cao et al. | |
| 2004/0026657 A1 | 2/2004 | Souter et al. | |
| 2004/0048762 A1 | 3/2004 | Stewart | |
| 2004/0050795 A1 | 3/2004 | Park et al. | |
| 2004/0132607 A1 | 7/2004 | Wood et al. | |
| 2004/0149634 A1 | 8/2004 | Hughes | |
| 2004/0217326 A1 | 11/2004 | Souter et al. | |
| 2004/0267006 A1 | 12/2004 | Yamane et al. | |
| 2005/0003992 A1 | 1/2005 | Del Duca et al. | |
| 2005/0013759 A1 | 1/2005 | Grow | |
| 2005/0025970 A1 | 2/2005 | Stipanovic | |
| 2005/0040116 A1 | 2/2005 | Purdy et al. | |
| 2005/0072729 A1 | 4/2005 | Bridges et al. | |
| 2005/0092669 A1 | 5/2005 | Ascher et al. | |
| 2005/0154361 A1 | 7/2005 | Sabesan | |
| 2005/0193800 A1 | 9/2005 | DeBoer et al. | |
| 2005/0202244 A1 | 9/2005 | Papagianakis | |
| 2006/0000763 A1 | 1/2006 | Rinker et al. | |
| 2006/0144781 A1 | 7/2006 | Carlson et al. | |
| 2006/0254988 A1 | 11/2006 | Frampton | |
| 2006/0261000 A1 | 11/2006 | Bassett et al. | |
| 2007/0009809 A1 | 1/2007 | Krekeler et al. | |
| 2007/0042174 A1 | 2/2007 | Rao et al. | |
| 2007/0175196 A1 | 8/2007 | Tepper et al. | |
| 2007/0215536 A1 | 9/2007 | Bommi et al. | |
| 2007/0256981 A1 | 11/2007 | Krogue et al. | |
| 2008/0022940 A1 | 1/2008 | Kirsch et al. | |
| 2008/0023405 A1 | 1/2008 | Rawson et al. | |
| 2008/0053922 A1 | 3/2008 | Honsinger et al. | |
| 2008/0121584 A1 | 5/2008 | Chen et al. | |
| 2008/0202992 A1 | 8/2008 | Bridges et al. | |
| 2008/0210606 A1 | 9/2008 | Burbank | |
| 2008/0261321 A1 * | 10/2008 | Patton | ...................... C07K 1/22 436/104 |
| 2009/0001011 A1 | 1/2009 | Knipmeyer et al. | |
| 2009/0047311 A1 | 2/2009 | Imahashi et al. | |
| 2009/0081262 A1 * | 3/2009 | Toledano | ............... A01N 25/26 424/401 |
| 2009/0111689 A1 | 4/2009 | Burba, III | |
| 2009/0142748 A1 | 6/2009 | Smith et al. | |
| 2009/0252709 A1 | 10/2009 | Nose et al. | |
| 2009/0264280 A1 | 10/2009 | Lisetskiy et al. | |
| 2009/0270253 A1 * | 10/2009 | Yang | ...................... B01J 20/041 502/414 |
| 2009/0291044 A1 | 11/2009 | Seok et al. | |
| 2010/0006508 A1 | 1/2010 | Mitchell et al. | |
| 2010/0044646 A1 | 2/2010 | Zhamu et al. | |
| 2010/0176037 A1 | 7/2010 | Namespetra et al. | |
| 2010/0209961 A1 | 8/2010 | Kshirsagar et al. | |
| 2010/0243572 A1 | 9/2010 | Stouffer et al. | |
| 2010/0272770 A1 | 10/2010 | De Windt et al. | |
| 2011/0094972 A1 | 4/2011 | King et al. | |
| 2011/0197657 A1 | 8/2011 | Gole | |
| 2011/0244012 A1 | 10/2011 | Iida et al. | |
| 2012/0125203 A1 | 5/2012 | Fitzgerald et al. | |
| 2012/0263777 A1 | 10/2012 | Woo et al. | |
| 2012/0330044 A1 | 12/2012 | Hou | |
| 2013/0168320 A1 | 7/2013 | Pradeep et al. | |
| 2013/0240439 A1 | 9/2013 | Pradeep et al. | |
| 2013/0292323 A1 | 11/2013 | Pradeep et al. | |
| 2014/0202943 A1 | 7/2014 | Pradeep et al. | |
| 2014/0216993 A1 | 8/2014 | Pradeep et al. | |
| 2014/0314951 A1 | 10/2014 | Pradeep et al. | |
| 2015/0132856 A1 | 5/2015 | Pradeep et al. | |

FOREIGN PATENT DOCUMENTS

| | | |
|---|---|---|
| AE | 325/2013 | 9/2011 |
| AE | 1012/2013 | 3/2012 |
| AE | 1080/2013 | 4/2012 |
| AE | 1161/2013 | 6/2012 |
| AU | 2012241522 | 3/2012 |
| AU | 2012243079 | 4/2012 |
| AU | 2012251424 | 6/2012 |
| AU | 2012342118 | 11/2012 |
| AU | 2014338691 | 6/2014 |
| BH | 20120155 | 6/2011 |
| BH | 20130024 | 9/2011 |
| BH | 20130034 | 9/2011 |
| BH | 20130123 | 3/2012 |
| BH | 20130129 | 4/2012 |
| BR | 112013024504 | 3/2012 |
| BR | 1120140125635 | 11/2012 |
| BR | 11 2015 03237 | 6/2014 |

(56) References Cited

FOREIGN PATENT DOCUMENTS

| | | |
|---|---|---|
| CA | 2270519 A1 | 11/2000 |
| CN | 1137490 A | 12/1996 |
| CN | 1113811 C | 7/2003 |
| CN | 1950301 A | 4/2007 |
| CN | 101218009 A | 7/2008 |
| CN | 101513188 A | 8/2009 |
| CN | 101628753 A | 1/2010 |
| CN | 101677575 A | 3/2010 |
| CN | 101700487 A | 5/2010 |
| CN | 201180037560.9 | 6/2011 |
| CN | 2011800509092 | 9/2011 |
| CN | 2011800529433 | 9/2011 |
| CN | 2012800218215 | 3/2012 |
| CN | 2012800258421 | 4/2012 |
| CN | 102438719 A | 5/2012 |
| CN | 2012800247893 | 6/2012 |
| CN | 2012800612986 | 11/2012 |
| CN | 201380025718 | 4/2013 |
| CN | 103179861 A | 6/2013 |
| CN | 103298550 A | 9/2013 |
| CN | 103339067 A | 10/2013 |
| CN | 103702730 A | 4/2014 |
| CN | 103747683 A | 4/2014 |
| CN | 103764245 A | 4/2014 |
| CN | 104168996 A | 11/2014 |
| CN | 104520706 A | 4/2015 |
| EP | 0541231 B1 | 6/1996 |
| EP | 0938925 A1 | 9/1999 |
| EP | 1401573 A1 | 3/2004 |
| FR | 2905628 A1 | 3/2008 |
| GB | 1247572 A | 9/1971 |
| GB | 1269556 A | 4/1972 |
| GB | 2470382 A | 11/2010 |
| GC | 2012-22869 | 11/2012 |
| GC | 2013-23735 | 3/2013 |
| IL | 223388 | 6/2011 |
| IL | 224990 | 9/2011 |
| IL | 225524 | 9/2011 |
| IL | 228609 | 3/2012 |
| IL | 228824 | 4/2012 |
| IL | 235206 | 4/2013 |
| IN | 200767 | 6/2006 |
| IN | 936/MUM/2008 | 11/2009 |
| IN | 1571/MUM/2008 | 1/2010 |
| IN | 169/CHE/2009 | 8/2010 |
| IN | 2893/CHE/2010 | 9/2010 |
| IN | 2089/CHE/2009 | 3/2011 |
| IN | 9101/DELNP/2013 | 4/2012 |
| IN | 2433/CHE/2010 | 6/2012 |
| IN | 2563/CHE/2010 | 6/2012 |
| IN | 2892/CHE/2010 | 7/2012 |
| IN | 947CHE/2011 | 10/2012 |
| IN | 1522/CHE/2011 | 11/2012 |
| IN | 4062/CHE/2011 | 6/2013 |
| IN | 4300/CHE/2011 | 6/2013 |
| IN | 2867/CHE/2013 | 2/2014 |
| IN | 9101/DELNP/2013 | 12/2014 |
| IN | 1529/CHE/2010 | 7/2015 |
| JP | 60-118285 | 6/1985 |
| JP | 62-192796 | 6/1989 |
| JP | 62-174909 | 7/1989 |
| JP | H04-225890 A | 8/1992 |
| JP | H06-306101 A | 11/1994 |
| JP | H08-141556 A | 6/1996 |
| JP | 10-180093 | 6/1998 |
| JP | 3049441 U | 6/1998 |
| JP | 11-189481 | 7/1999 |
| JP | H11-309368 A | 11/1999 |
| JP | 2004-305870 A | 11/2004 |
| JP | 2005-514510 A | 5/2005 |
| JP | 2006-068701 A | 3/2006 |
| JP | 2006-291031 A | 10/2006 |
| JP | 2008-030975 A | 2/2008 |
| JP | 2008-542001 A | 11/2008 |
| JP | 2010-129385 A | 6/2010 |
| JP | 2013-513004 | 6/2011 |
| JP | 2013-526567 | 9/2011 |
| JP | 2013-530819 | 9/2011 |
| JP | 2011-225521 A | 11/2011 |
| JP | 2014-500489 | 3/2012 |
| JP | 2014-508886 | 6/2012 |
| JP | 2014-542953 | 11/2012 |
| JP | 2013-505476 A | 2/2013 |
| JP | 2013-509551 A | 3/2013 |
| JP | 2015-506324 | 4/2013 |
| JP | 2013-527118 A | 6/2013 |
| JP | 2013-530908 | 8/2013 |
| JP | 2013-53868 A | 10/2013 |
| JP | 2014-509938 A | 4/2014 |
| JP | 2014-516775 A | 7/2014 |
| JP | 2015-504364 A | 2/2015 |
| KR | 10-2013-7028290 | 3/2012 |
| KR | 2013-7031706 | 6/2012 |
| KR | 10-2014-7017385 | 11/2012 |
| KR | 1020167002153 | 6/2014 |
| MX | 2013011011 | 3/2012 |
| MX | 2013011745 | 4/2012 |
| MX | 2013012788 | 6/2012 |
| MX | 2014006245 | 11/2012 |
| MX | 2014012608 | 4/2013 |
| MX | 201507965 | 6/2014 |
| MX | 2013011745 A | 7/2014 |
| MX | 2014006245 A | 10/2014 |
| PK | 7872012 | 11/2012 |
| SG | 201208847-2 | 6/2011 |
| SG | 10201504247 Y | 6/2011 |
| SG | 201301541-7 | 9/2011 |
| SG | 2013023544 | 9/2011 |
| SG | 201307205-3 | 3/2012 |
| SG | 201307554-4 | 4/2012 |
| SG | 11201402580 S | 11/2012 |
| SG | 1120140258 S | 4/2015 |
| TW | 200516058 | 5/2005 |
| TW | 200833614 A | 8/2008 |
| WO | WO 9741063 A1 * | 11/1997 ............ B82Y 30/00 |
| WO | WO-2002/064507 A2 | 8/2002 |
| WO | WO-2003/000413 A1 | 1/2003 |
| WO | WO-2003/043731 A1 | 5/2003 |
| WO | WO-2003/060003 A1 | 7/2003 |
| WO | WO-2003/089112 A1 | 10/2003 |
| WO | WO-2003/103800 A2 | 12/2003 |
| WO | WO-2004/000732 A1 | 12/2003 |
| WO | WO-2006/070953 A1 | 7/2006 |
| WO | WO-2006/072944 A2 | 7/2006 |
| WO | WO-2006/121932 A1 | 11/2006 |
| WO | WO-2006/0128187 A2 | 11/2006 |
| WO | WO-2007/010977 A1 | 1/2007 |
| WO | WO-2007/059832 A1 | 5/2007 |
| WO | WO-2007/117416 A2 | 10/2007 |
| WO | WO-2007/144256 A1 | 12/2007 |
| WO | WO-2008/020315 A2 | 2/2008 |
| WO | WO-2008/027530 A1 | 3/2008 |
| WO | WO-2008/106276 A2 | 9/2008 |
| WO | WO-2009/085553 A1 | 7/2009 |
| WO | WO-2009/150232 A2 | 12/2009 |
| WO | WO-2010/003267 A1 | 1/2010 |
| WO | WO-20101022353 A1 | 2/2010 |
| WO | WO-2010/059165 A1 | 5/2010 |
| WO | WO-2010/096521 A2 | 8/2010 |
| WO | WO-2011/013142 A2 | 2/2011 |
| WO | WO-2011/015429 A2 | 2/2011 |
| WO | WO-2011/034544 | 3/2011 |
| WO | WO-2011/053158 | 5/2011 |
| WO | PCT/IB2011/001551 | 6/2011 |
| WO | PCT/IB2011/002740 | 9/2011 |
| WO | PCT/IB2011/002790 | 9/2011 |
| WO | WO-2011/131722 A1 | 10/2011 |
| WO | WO-2011/141486 A1 | 11/2011 |
| WO | WO-2011/151725 A2 | 12/2011 |
| WO | PCT/IB2012/001079 | 3/2012 |
| WO | WO-2012/028964 A2 | 3/2012 |
| WO | PCT/US2012/032880 | 4/2012 |
| WO | WO-2012/042388 A2 | 4/2012 |
| WO | PCT/IB2012/001237 | 6/2012 |

(56) References Cited

FOREIGN PATENT DOCUMENTS

| WO | WO-2012/140520 A2 | 10/2012 |
|----|-------------------|---------|
| WO | WO-2012/142025 A1 | 10/2012 |
| WO | PCT/IB202/002885 | 11/2012 |
| WO | PCT/IB212/002885 | 11/2012 |
| WO | WO-2012/150506 A2 | 11/2012 |
| WO | PCT/IB2013/001244 | 4/2013 |
| WO | WO-2013/076581 A2 | 5/2013 |
| WO | WO-2013/156870 A2 | 10/2013 |
| WO | PCT/IB2014/002316 | 6/2014 |
| WO | WO-2015/059562 A1 | 4/2015 |

OTHER PUBLICATIONS

U.S. Appl. No. 14/110,424, filed Oct. 7, 2013, US 2014/0158625, Jun. 12, 2014, Pradhan (Nanoholdings, LLC).

U.S. Appl. No. 13/701,561, filed Dec. 3, 2012, US 2013/0168320, Jul. 4, 2013, Pradeep (Indian Institute of Technology).

U.S. Appl. No. 13/820403, filed Sep. 2, 2011, US-2013-0240439-A1, Sep. 19, 2013, Pradeep (Indian Institute of Technology).

U.S. Appl. No. 13/877,294, filed Jul. 11, 2013, US 2013/0292323, Nov. 7, 2013, Pradeep (Indian Institute of Technology).

U.S. Appl. No. 14/007,295, filed Mar. 27, 2014, US 2014/0202943, Jul. 24, 2014, Pradeep (Indian Institute of Technology).

U.S. Appl. No. 14/115,591, filed Dec. 2, 2013, US 2014/0216993, Aug. 7, 2014, Pradeep (Indian Institute of Technology).

U.S. Appl. No. 14/394,825, filed Apr. 17, 2013, US-2015-0132856-A1, May 14, 2015, Pradeep (Indian Institute of Technology).

U.S. Appl. No. 14/900,740, filed Jun. 27, 2014, US-2016-0135468-A1, May 19, 2016, Pradeep (Indian Institute of Technology).

Examination Report dated Sep. 10, 2015 by Intellectual Property India for application 2893/CHE/2010, filed on Sep. 3, 2010 and published on Jul. 20, 2012 (Applicant—Indian Institute of Technology) (5 pages).

Adhikari, B. & A. Banerjee, Facile Synthesis of Water-Soluble Fluorescent Silver Nanoclusters and HgII Sensing, Chem Mater, 22(15):4364-71 (2010).

Ali et al., Advances in Water Treatment by Adsorption Technology, Nature Protocols, 1(6):2661 (2006).

Bandyopadhyaya et al., Silver-Embedded Granular Activated Carbon as an Antibacterial Medium for Water Purification, J Chem Technol Biotechnol, 83:1177-80 (2008).

Bhatnager, A. et al., Fluoride Removal from Water by Adsorption—A Review, Chemical Engineering Journal, 171:811-40 (2011).

Bootharaju, M.S. & T. Pradeep, Investigation into the Reactivity of Unsupported and Supported Ag7 and Ag8 Clusters with Toxic Metal Ions, Langmuir, 27(13):8134-43 (2011).

Brown et al., Observations on Halogens as Bathing Water Disinfectants, J Appl Microbiol, 29(3):559 (1966).

Chakraborty, I. et al., Luminescent Sub-Nanometer Clusters for Metal Ion Sensing: A New Direction in Nanosensors, J Haz Mater, 211-212:396-403 (2012).

Chandra et al., Water-Dispersible Magnetite-Reduced Graphene Oxide Composites for Arsenic Removal, ACS Nano, 4(7): 3979-3986 (2010).

Colwell et al., Reduction of Cholera in Bangledeshi Villages by Simple Filtration, PNAS, 100:1051-5 (2003).

Crittenden et al., Predicting GAC Performance with Rapid Small-Scale Column Tests, J Am Water Works Assoc, 83:77-87 (1991).

Dhanalakshmi, L. et al., Conversion of Double Layer Charge-Stabilized Ag@Citrate Colloids to Thiol Passivated Luminescent Quantum Clusters, Chem Commun, 48:859-61 (2012).

Diez, I. et al., Color Tunability and Electrochemiluminescence of Silver Nanoclusters, Angew Chem Ind Ed, 48(12):2122-5 (2009).

Dunè, Belle, Graphene Soaks up Arsenic, Jul. 14, 2010, p. 1-2; Retrieved from http://web.archive.org/web/ 920100716215221/ http://environmentalresearchweb.org/cws/article/news/43168>.

Hijnen et al., Elimination of Viruses, Bacteria, and Protozoan Oocysts by Slow Sand Filtration, Water Sci Technol, 50(1):147-54 (2004).

Ho, Y.S. and G. McKay, The Kinetics of Sorption of Divalent Metal Ions onto Sphagnum Moss Peat Reaction Rate Models, Water Res, 34:735 (2000).

Hoek, E.M.V. et al., High-Throughput Screening of Silver Nanoparticle Stability and Bacterial Inactivation in Aquatic Media: Influence of Specific Ions, Environ Sci Technol, 44(19):7321-8 (2010).

Hu, Z. et al., Nanocomposite of Chitosan and Silver Oxide and Its Antibacterial Property, J Appl Polym Sci, 108(1): 52-6 (2008).

Hummers, W.S. and R.E. Offerman, Preparation of Graphitic Oxide, J Am Chem Soc, 80:1339 (1958).

Hurt, R.H., ed., International Committee for Characterization and Terminology of Carbon "First Publication of 30 Tentative Definitions," Journal of Carbon, 20(5):445-9 (1982).

Jagtap, S. et al., Synthesis and Characterization of Lanthanum Impregnated Chitosan Flakes for Fluoride Removal in Water, Destination, 273:267-75 (2011).

Jung et al., Antibacterial Activity and Mechanism of Action of the Silver Ion in *Staphylococcus aureus* and *Escherichia coli*, Appl Environ Microbol, 74(7):2171 (2008).

Kittler, S. et al., Toxicity of Silver Nanoparticles Increases During Storage Because of Slow Dissolution Under Release of Silver Ions, Chem Mater, 22(16):4548-54 (2010).

Koltuniewicz et al., Membranes in Clean Technologies: Theory and Practice, Wiley-VCH, vol. 1 (2008).

Kovtyukhova, N.I. et al., Layer-by-Layer Assembly of Ultrathin Composite Films from Micron-Sized Graphite Oxide Sheets and Polycations, Chem Mater, 11:771 (1999).

Lan, G.Y. et al., Silver Nanoclusters as Fluorescent Probes for Selective and Sensitive Detection of Copper Ions, Chem. Commun., 46:1257-9 (2010).

Ledo-Suárez, A. et al., Facile Synthesis of Stable Sub-Nanosized Silver Clusters in Microemulsions, Angew. Chem Int Ed, 46(46):8823-7 (2007).

Lee, T.H. et al., Single-Molecule Optoelectronics, Acc Chem Res, 38(7):534-41 (2005).

Leelavathi, A. et al., Supported Quantum Clusters of Silver as Enhanced Catalysts for Reduction, Nanoscale Res Lett, 6:123-32 (2011).

Li D. et al., Processable Aqueous Dispersions of Graphene Nanosheets, Nat Nanotech, 3:101 (2008).

Liu, J. and R.H. Hurt, Ion Release Kinetics and Particle Persistence of Aqueous Nano-Silver Colloids, Environ Sci Technol, 44(6):2169-75 (2010).

Liu, R. et al., Defluoridation by Freshly Prepared Aluminum Hydroxide, 175:144-9 (2011).

Lixia, L.U. et al., Study on Preparation and Absorption of Fluorion of Chitosan Composite Microspheres, Chem Ind Times, 18(2):45-6 (2004).

Lopez-Lopez, M.T. et al., Stability and Magnetic Characterization of Oleate-Covered Magnetite Ferrofluids in Different Nonpolar Carriers, J Colloid Interface Sci, 291(1):144-51 (2005).

Makarava, N. et al., Water-Soluble Hybrid Nanoclusters with Extra Bright and Photostable Emissions: A New Tool for Biological Imaging, Biophys J, 89(1):572-80 (2005).

Mathew, A. et al., A Fifteen Atom Silver Cluster Confined in Bovine Serum Albumin, J Mater Chem, 21930):11205-12 (2011).

Miretzky, P. & A.F. Cirelli, Fluoride Removal from Water by Chitosan Derivatives and Composites: A Review, J Fluorine Chemistry, 132:231-40 (2011).

Mohapatra et al., Synthesis and Applications of Nano-Structured Iron Oxides/Hydroxides—A Review, International Journal of Engineering, Science and Technology, 2(8):127-46 (2010).

Mrudula, K.V. et al., Interfacial Synthesis of Luminescent 1 kDa Silver Clusters, J Mater Chem, 19(25):4335-42 (2009).

Muhammed, M.A.H. et al., Two Distinct Fluorescent Quantum Clusters of Gold Starting from Metallic Nanoparticles by pH-Dependent Ligand Etching, Nano Res, 1(4):333-40 (2008).

Muhammed, M.A.H., & T.Pradeep, Reactivity of Au25 Clusters with Au 3+, Chem Phys Lett, 449:186-190 (2007).

(56) References Cited

OTHER PUBLICATIONS

Oyanedel-Craver et al., Sustainable Collodial-Silver-Impregnated Ceramic Filter for Point-of-Use Water, Environ Sci Technol, 42:927-33 (2008).
Pal, S. et al., Does the Antibacterial Activity of Silver nanoparticles Depend on the Shape of the Nanoparticle? A Study of the Gram-Negative Bacterium *Escherichia coli*, Appl Environ Microbiol, 73(6):1712-20 (2007).
Patel, S.A. et al., Water-Soluble Ag Nanoclusters Exhibit Strong Two-Photon-Induced Fluoresence, J Am Chem Soc, 130(35):11602-3 (2008).
Peyser-Capadona, L. et al., Nanoparticle-Free Single Molecule Anti-Stokes Raman Spectroscopy, Phys Rev Lett, 94(5):058301 (2005).
Pradeep, T. et al., Noble Metal Nanoparticles for Water Purification: A Critical Review, Thin Solid Films, 517:6452 (2009).
Rao, T.U.B. & T. Pradeep, Luminescent Ag7 and Ag8 Clusters by Inerfacial Synthesis, Angew Chem Ind Ed, 49(23):3925-9 (2010).
Rao, T.U.B. et al., Ag7Au6: A 13-Atom Alloy Quantum Cluster, Angew Chem Ind Ed, 51(9):2155-9 (2012).
Rao, T.U.B. et al., Ag9 Quantum Cluster Through a Solid-State Route, J Am Chem Soc, 132(46):16304-7 (2010).
Shang, L. & S. Dong, Sensitive Detection of Cysteine Based on Fluorescent Silver Clusters, Biosens Bioelectron, 24(6):1569-73 (2009).
Sharma, J. et al., A Complementary Palette of Fluorescent Silver Nanoclusters, Chem Commun, 46(19):3280-2 (2010).
Shimizu, K. et al., Direct Dehydrogenative Amide Synthesis from Alcohols and Amines Catalyzed by ?-Alumina Supported Silver Cluster, Chem Eur J, 15(39):9977-80 (2009).
Shimizu, K. et al., Oxidant-Free Dehydrogenation of Alcohols Heterogeneously Catalyzed by Cooperation of Silver Clusters and Acid-Base Sites on Alumina, Chem Eur J, 15(10):2341-51 (2009).
Suidan et al., Reduction of Aqueous Free Chlorine with Granular Activated Carbon—pH and Temperature Effects, Environ Sci Technol, 11(8):785-9 (1977).
Sun, Y. et al., First Principles Studies of Two Luminescent Molecular Quantum Clusters of Silver, Ag7(H2MSA)7 and Ag8(H2MSA)8, Based on Experimental Fluorescence Spectra, J Phys Chem C, 115(42):20380-7 (2011).
Tiwari, Dhermendra K. et al., World Applied Science Journal, 3(3):417-33 (2008).
Vasireddy, D., Arsenic Adsorption onto Iron-Chitosan Composite from Drinking Water, Master os Science Thesis at Univ. of Missouri-Columbia (2005) (111 pages).
Vosch, T. et al., Strongly Emissive Individual DNA-Encapsulated Ag Nanoclusters as Single-Molecule Fluorophores, Proc Natl Acad Sci USA, 104(31):12616-21 (2007).
Warsakoon, E. et al., Defluorination of Drinking Water Using Layered Double Hydorxides, International Conference on Sustainable Built Environment, Kandy, 13-14, p. 64-6 (2010).
Xu, H. & K.S. Suslick, Sonochemical Synthesis of Highly Fluorescent Ag Nanoclusters, ACS Nano, 4(6):3209-14 (2010).
Xu, H. & K.S. Suslick, Water-Soluble Fluorescent Silver Nanoclusters, Adv Mater, 22(10):1078-82 (2010).
Zhang, H. and G. Chen, Potent Antibacterial Activities of Ag/TiO$_2$ Nanocomposite Powders Synthesized by a One-Pot Sol-Gel Method, Environ Sci Technol, 43(8):2905-10 (2009).
First Office Action dated Nov. 24, 2014 by the State Intellectual Property Office of the People's Republic of China for Chinese Patent Application No. 2012800258421, which was filed on Apr. 10, 2012 and published as CN103764245 dated Arpil 30, 2014 (Inventor—Pradhan et al.; Applicant—NanoHoldings, LLC) (10 pages).
Response to First Office Action filed on Jun. 29, 2015 with the State Intellectual Property Office of the People's Republic of China for Chinese Patent Application No. 2012800258421, which was filed on Apr. 10, 2012 and published as CN103764245 dated Arpil 30, 2014 (Inventor—Pradhan et al.; Applicant—NanoHoldings, LLC) (4 pages).
International Search Report and Written Opinion dated Jul. 11, 2012 by the International Searching Authority for International Patent Application No. PCT/US2012/032880, which was filed on Apr. 10, 2012 and published as WO 2012/142025 dated Oct. 18, 2012 (Inventor—Pradhan et al.; Applicant—NanoHoldings, LLC) (8 pages).
International Preliminary Report on Patentability dated Oct. 15, 2013 by the International Searching Authority for International Patent Application No. PCT/US2012/032880, which was filed on Apr. 10, 2012 and published as WO 2012/142025 dated Oct. 18, 2012 (Inventor—Pradhan et al.; Applicant—NanoHoldings, LLC) (6 pages).
Examination report dated May 19, 2015 by the Intellectual Property Office of Singapore for Singaporean Patent Application No. 2013075544, which was filed on Apr. 10, 2012 (Inventor—Pradhan et al.;Applicant—NanoHoldings, LLC) (10 pages).
Search Report and Written Opinion dated Nov. 17, 2014 by the Intellectual Property Office of Singapore for Singaporean Patent Application No. 2013075544, which was filed on Apr. 10, 2012 (Inventor—Pradhan et al.; Applicant—NanoHoldings, LLC) (14 pages).
First Office Action dated Dec. 3, 2013 by the State Intellectual Property Office of the People's Republic of China for Chinese Patent Application No. 201180037560.9, which was filed on Jun. 2, 2011 and published as CN103179861 dated Jun. 26, 2013 (Inventor—Pradeep et al.; Applicant—NanoHoldings LLC) (7 pages).
Response to First Office Action filed on Jun. 18, 2014 by the State Intellectual Property Office of the People's Republic of China for Chinese Patent Application No. 201180037560.9, which was filed on Jun. 2, 2011 and published as CN103179861 dated Jun. 26, 2013 (Inventor—Pradeep et al.; Applicant—NanoHoldings LLC) (15 pages).
Second Office Action dated Aug. 12, 2014 by the State Intellectual Property Office of the People's Republic of China for Chinese Patent Application No. 201180037560.9, which was filed on Jun. 2, 2011 and published as CN103179861 dated Jun. 26, 2013 (Inventor—Pradeep et al.; Applicant—NanoHoldings LLC) (9 pages).
Response to Second Office Action filed on May 21, 2015 by the State Intellectual Property Office of the People's Republic of China for Chinese Patent Application No. 201180037560.9, which was filed on Jun. 2, 2011 and published as CN103179861 dated Jun. 26, 2013 (Inventor—Pradeep et al.; Applicant—NanoHoldings LLC) (14 pages).
Examination Report dated Feb. 24, 2015 by the Israel Patent Office for Israeli Patent Application No. 223388, which was filed on Jun. 2, 2011 (Inventor—Pradeep et al.; Applicant—NanoHoldings LLC) (3 pages).
International Search Report and Written Opinion dated Dec. 1, 2011 by the International Searching Authority for International Patent Application No. PCT/IB2011/001551, which was filed on Jun. 2, 2011 and published as WO 2011/151725 dated Dec. 8, 2011 (Inventor—Pradeep et al.; Applicant—NanoHoldings, LLC) (13 pages).
International Preliminary Report on Patentability dated Dec. 4, 2012 by the International Searching Authority for International Patent Application No. PCT/IB2011/001551, which was filed on Jun. 2, 2011 and published as WO 2011/151725 dated Dec. 8, 2011 (Inventor—Pradeep et al.; Applicant—NanoHoldings, LLC) (12 pages).
Search Report and Written Opinion dated Mar. 11, 2014 by the Danish Patent and Trademark Office for Singaporean Patent Application No. 201208847-2, which was filed on Jun. 2, 2011 (Inventor—Pradeep et al.; Applicant—NanoHoldings LLC) (18 pages).
Preliminary Amendment filed on Dec. 3, 2012 with the U.S. Patent and Trademark Office for U.S. Appl. No. 13/701,561, filed Feb. 19, 2013 and published as US 2013/0168320 dated Jul. 4, 2013 (Inventor—Pradeep et al.; Applicant—NanoHoldings LLC) (7 pages).
Restriction Requirement dated Nov. 20, 2014 by the U.S. Patent and Trademark Office for U.S. Appl. No. 13/701,561, filed Feb. 19, 2013 and published as US 2013/0168320 dated Jul. 4, 2013 (Inventor—Pradeep et al.; Applicant—NanoHoldings LLC) (8 pages).
Response to Restriction Requirement filed on May 20, 2015 with the U.S. Patent and Trademark Office for U.S. Appl. No.

(56) References Cited

OTHER PUBLICATIONS

13/701,561, filed Feb. 19, 2013 and published as US 2013/0168320 dated Jul. 4, 2013 (Inventor—Pradeep et al.; Applicant—NanoHoldings LLC) (3 pages).
First Office Action dated Aug. 7, 2014 by the State Intellectual Property Office of the People's Republic of China for Chinese Patent Application No. 2011800529433, which was filed on Sep. 2, 2011 and Published as CN103298550 dated Sep. 11, 2013 (Inventor—Pradeep et al.; Applicant—NanoHoldings LLC) (7 pages).
Response to First Office Action filed on Jul. 20, 2015 with the State Intellectual Property Office of the People's Republic of China for Chinese Patent Application No. 2011800529433, which was filed on Sep. 2, 2011 and published as CN103298550 dated Sep. 11, 2013 (Inventor—Pradeep et al.; Applicant—NanoHoldings LLC) (16 pages).
First Office Action dated Apr. 20, 2015 by the Japan Patent Office for Japanese Patent Application No. 2013-526567, which was filed on Sep. 2, 2011 (Inventor—Pradeep et al.; Applicant—NanoHoldings LLC) (14 pages).
International Search Report and Written Opinion dated Apr. 23, 2013 by the International Searching Authority for International Patent Application No. PCT/IB2011/002740, which was filed on Sep. 2, 2011 and published as WO 2012/028964 dated Mar. 8, 2012 (Inventor—Pradeep et al.; Applicant—NanoHoldings, LLC) (7 pages).
International Preliminary Report on Patentability dated May 21, 2013 by the International Searching Authority for International Patent Application No. PCT/IB2011/002740, which was filed on Sep. 2, 2011 and published as WO 2012/028964 dated Mar. 8, 2012 (Inventor—Pradeep et al.; Applicant—NanoHoldings, LLC) (6 pages).
Search Report and Written Opinion dated May 27, 2014 by the Danish Patent and Trademark Office for Singaporean Patent Application No. 201301541-7, which was filed on Sep. 2, 2011 (Inventor—Pradeep et al.; Applicant—NanoHoldings LLC) (17 pages).
Preliminary Amendment filed on Mar. 1, 2013 with the U.S. Patent and Trademark Office for U.S. Appl. No. 13/820,403, which was filed on May 14, 2013 and published as US 2013/0240439 dated Sep. 19, 2013 (Inventor—Pradeep et al.; Applicant—NanoHoldings LLC) (6 pages).
First Office Action dated Dec. 10, 2013 by the State Intellectual Property Office of the People's Republic of China for Chinese Patent Application No. 2011800509092, which was filed on Sep. 30, 2011 and published as CN103339067 dated Oct. 2, 2013 (Inventor—Pradeep et al.; Applicant—NanoHoldings LLC) (17 pages).
Response to First Office Action filed on Jun. 25, 2014 with the State Intellectual Property Office of the People's Republic of China for Chinese Patent Application No. 2011800509092, which was filed on Sep. 30, 2011 and published as CN103339067 dated Oct. 2, 2013 (Inventor—Pradeep et al.; Applicant—NanoHoldings LLC) (14 pages).
Second Office Action dated Jul. 15, 2014 by the State Intellectual Property Office of the People's Republic of China for Chinese Patent Application No. 2011800509092, which was filed on Sep. 30, 2011 and published as CN103339067 dated Oct. 2, 2013 (Inventor—Pradeep et al.; Applicant—NanoHoldings LLC) (12 pages).
Response to Second Office Action filed on Nov. 28, 2014 with the State Intellectual Property Office of the People's Republic of China for Chinese Patent Application No. 2011800509092, which was filed on Sep. 30, 2011 and published as CN103339067 dated Oct. 2, 2013 (Inventor—Pradeep et al.; Applicant—NanoHoldings LLC) (12 pages).
Third Office Action dated Feb. 10, 2015 by the State Intellectual Property Office of the People's Republic of China for Chinese Patent Application No. 2011800509092, which was filed on Sep. 30, 2011 and published as CN103339067 dated Oct. 2, 2013 (Inventor—Pradeep et al.; Applicant—NanoHoldings LLC) (11 pages).
Response to Third Office Action filed on Jun. 25, 2015 with the State Intellectual Property Office of the People's Republic of China for Chinese Patent Application No. 2011800509092, which was filed on Sep. 30, 2011 and published as CN103339067 dated Oct. 2, 2013 (Inventor—Pradeep et al.; Applicant—NanoHoldings LLC) (12 pages).
Office Action dated Apr. 15, 2015 by the Japan Patent Office for Japanese Patent Application No. 2013-530819, which was filed on Sep. 30, 2011 and published as 2013-538686 dated Oct. 17, 2013 (Inventor—Pradeep et al.; Applicant—NanoHoldings LLC) (10 pages).
International Search Report and Written Opinion dated May 15, 2012 by the International Searching Authority for International Patent Application No. PCT/IB2011/002790, which was filed on Sep. 30, 2011 and published as WO 2012/042388 dated Apr. 5, 2012 (Inventor—Pradeep; Applicant—NanoHoldings, LLC) (8 pages).
International Preliminary Report on Patentability dated Apr. 2, 2013 by the International Searching Authority for International Patent Application No. PCT/IB2011/002790, which was filed on Sep. 30, 2011 and published as WO 2012/042388 dated Apr. 5, 2012 (Inventor—Pradeep; Applicant—NanoHoldings, LLC) (7 pages).
Search Report and Written Opinion dated Mar. 3, 2015 by the Danish Patent and Trademark Office for Singaporean Patent Application No. 2013023544, which was filed on Sep. 30, 2011 (Inventor—Pradeep et al; Applicant—NanoHoldings LLC) (13 pages).
Preliminary Amendment filed on Apr. 1, 2013 with the U.S. Patent and Trademark Office for U.S. Appl. No. 13/877,294, filed Jul. 11, 2013 and published as US 2013/0292323 dated Nov. 7, 2013 (Inventor—Pradeep et al.; Applicant—NanoHoldings LLC) (7 pages).
Non-Final Office Action dated Aug. 12, 2015 by the U.S. Patent and Trademark Office for U.S. Appl. No. 13/877,294, filed Jul. 11, 2013 and published as US 2013/0292323 dated Nov. 7, 2013 (Inventor—Pradeep et al.; Applicant—NanoHoldings LLC) (17 pages).
First Office Action dated Nov. 3, 2014 by the State Intellectual Property Office of the People's Republic of China for Chinese Patent Application No. 2012800219215, which was filed on Mar. 23, 2012 and published as CN103702730 dated Apr. 2, 2014 (Inventor—Pradeep et al; Applicant—NanoHoldings LLC) (7 pages).
International Search Report and Written Opinion dated Dec. 6, 2012 by the International Searching Authority for International Patent Application No. PCT/IB2012/001079, which was filed on Mar. 23, 2012 and published as WO 2012/140520 dated Oct. 18, 2012 (Inventor—Pradeep et al.; Applicant—NanoHoldings LLC) (11 pages).
International Preliminary Report on Patentability dated Oct. 1, 2013 by the International Searching Authority for International Patent Application No. PCT/IB2012/001079, which was filed on Mar. 23, 2012 and published as WO 2012/140520 dated Oct. 18, 2012 (Inventor—Pradeep et al.; Applicant—NanoHoldings LLC) (10 pages).
Search Report and Written Opinion dated Apr. 7, 2015 by the Danish Patent and Trademark Office for Singaporean Patent Application No. 201307205-3, which was filed on Mar. 23, 2012 (Inventor—Pradeep et al; Applicant—NanoHoldings LLC) (21 pages).
Preliminary Amendment filed on Sep. 24, 2013 with the U.S. Patent and Trademark Office for U.S. Appl. No. 14/007,295, filed Mar. 27, 2014 and published as US 2014/0202943 dated Jul. 24, 2014 (Inventor—Pradeep et al.; Applicant—NanoHoldings LLC) (3 pages).
First Office Action dated Oct. 30, 2014 by the State Intellectual Property Office of the People's Republic of China for Chinese Patent Application No. 2012800247893, which was filed on Jun. 22, 2012 and published as CN103747683 dated Apr. 23, 2014 (Inventor—Predeep et al; Applicant—NanoHoldings LLC) (8 pages).
Response to First Office Action filed on Aug. 6, 2015 with the State Intellectual Property Office of the People's Republic of China for Chinese Patent Application No. 2012800247893, which was filed on Jun. 22, 2012 and published as CN103747683 dated Apr. 23, 2014 (Inventor—Predeep et al; Applicant—NanoHoldings LLC) (10 pages).
Office Action dated Jul. 21, 2015 by the Israel Patent Office for Israeli Patent Application No. PCT/IB2012/001237, wich was filed on Jun. 22, 2012 (Inventor—Pradeep et al.; Applicant—NanoHoldings LLC) (2 pages).

(56) References Cited

OTHER PUBLICATIONS

International Search Report and Written Opinion dated Oct. 22, 2012 by the International Searching Authority for International Patent Application No. PCT/IB/2012/001237, which was filed on Jun. 22, 2012 and published as WO 2012/150506 dated Nov. 8, 2012 (Inventor—Predeep et al.; Applicant—NanoHoldings LLC) (12 pages).
International Preliminary Report on Patentability dated Nov. 5, 2013 by the International Searching Authority for International Patent Application No. PCT/IB/2012/001237, which was filed on Jun. 22, 2012 and published as WO 2012/150506 dated Nov. 8, 2012 (Inventor—Predeep et al.; Applicant—NanoHoldings LLC) (10 pages).
Preliminary Amendment filed on Nov. 4, 2013 with the U.S. Patent and Trademark Office for U.S. Appl. No. 14/115,591, filed Dec. 2, 2013 and published as US 2014/0216993 dated Aug. 7, 2014 (Inventor—Pradeep et al.; Applicant—NanoHoldings LLC) (3 pages).
International Search Report and Written Opinion dated Jun. 21, 2013 by the International Searching Authority for International Patent Application No. PCT/IB2012/002885, which was filed on Nov. 20, 2012 and published as WO 2013/076581 dated May 30, 2013 (Inventor—Pradeep et al.; Applicant—NanoHoldings LLC) (8 pages).
International Preliminary Report on Patentability dated May 27, 2014 by the International Searching Authority for International Patent Application No. PCT/IB2012/002885, which was filed on Nov. 20, 2012 and published as WO 2013/076581 dated May 30, 2013 (Inventor—Pradeep et al.; Applicant—NanoHoldings LLC) (7 pages).
Examination Report dated Mar. 10, 2015 by the Government of Pakistan Intellectual Property Organization—The Patent Office for Pakistani Patent No. 787/2012, which was filed on Nov. 22, 2012 (Inventor—Pradeep et al.; Applicant—NanoHoldings LLC) (2 pages).
Search Report dated Feb. 2, 2015 by the Intellectual Property Office of Singapore for Singaporean Patent No. 11201402580S, which was filed on Nov. 20, 2012 and granted as 11201402580S dated Apr. 29, 2015 (Inventor—Pradeep et al.; Applicant—NanoHoldings LLC) (18 pages).
Notice of Grant dated Apr. 29, 2015 by the Intellectual Property Office of Singapore for Singaporean Patent No. 11201402580S, which was filed on Nov. 20, 2012 and granted as 11201402580S dated Apr. 29, 2015 (Inventor—Pradeep et al.; Applicant—NanoHoldings LLC) (3 pages).
International Search Report and Written Opinion dated Nov. 8, 2013 by the International Searching Authority for International Patent No. PCT/IB2013/001244, which was published on Apr. 17, 2013 and published as WO 2013/156870 dated Oct. 24, 2013 (Inventor—Pradeep et al.; Applicant—NanoHoldings LLC) (8 pages).
International Preliminary Report on Patentability dated Oct. 21, 2014 by the International Searching Authority for International Patent No. PCT/IB2013/001244, which was published on Apr. 17, 2013 and published as WO 2013/156870 dated Oct. 24, 2013 (Inventor—Pradeep et al.; Applicant—NanoHoldings LLC) (7 pages).
Preliminary Amendment filed on Oct. 16, 2014 with the U.S. Patent and Trademark Office for U.S. Appl. No. 14/394,825, filed Oct. 16, 2014 and published as US 2015/0132856 dated May 14, 2015 (Inventor—Pradeep et al.; Applicant—NanoHoldings LLC) (3 pages).
International Search Report dated Mar. 13, 2015 by the International Searchnig Authority for International Patent Application No. PCT/IB2014/002316, which was filed on Jun. 27, 2014 and published as WO 2015/059562 dated Apr. 30, 2015 (Inventor—Pradeep et al.; Applicant—NanoHoldings LLC) (3 pages).
First Office Action dated Aug. 3, 3015 by the State Intellectual Property Office of the People's Republic of China for Chinese Patent Application No. 2012800612986 Inventor—Pradeep et al; Applicant—NanoHoldings LLC) (5 pages).

First Office Action dated Aug. 21, 3015 by the State Intellectual Property Office of the People's Republic of China for Chinese Patent Application No. 201380025718X Inventor—Pradeep et al; Applicant—NanoHoldings LLC) (8 pages).
Non-Final Office Action dated Sep. 24, 2015 by the U.S. Patent and Trademark Office for U.S. Appl. No. 13/820,403, filed May 14, 2014 (Inventor—Pradeep et al.; Applicant—NanoHoldings LLC) (15 pages).
Office Action dated Sep. 25, 2015 by the Mexican Patent Office for application MX/a/2013/011745, filed on Oct. 9, 2013 (Applicant—Nanoholdings, Inc.) (4 pages).
Fourth Office Action dated Oct. 23, 2015 by the State Intellectual Property Office of the People's Republic of China for Chinese Patent Application No. 201180050909.2, which was filed on Sep. 30, 2011 and published as CN103339067 dated Oct. 2, 2013 (Inventor—Pradeep et al.; Applicant—NanoHoldings LLC) (12 pages).
Non-Final Office Action dated Nov. 5, 2015 by the U.S. Patent and Trademark Office for U.S. Appl. No. 14/007,295, filed Mar. 27, 2014 (Inventor—Pradeep et al.; Applicant—NanoHoldings LLC) (21 pages).
Third Office Action dated Dec. 11, 2015 by the State Intellectual Property Office of the People's Republic of China for Chinese Patent Application No. 2012800219215, which was filed on Mar. 23, 2012 and published as CN103702730 dated Apr. 2, 2014 (Inventor—Pradeep et al; Applicant—NanoHoldings LLC) (6 pages).
Non-Final Office Action dated Jul. 29, 2015 by the U.S. Patent and Trademark Office for U.S. Appl. No. 14/110,424, filed Feb. 21, 2014 and published as US 2014/0158625 dated Jun. 12, 2014 (Inventor—Pradeep et al.; Applicant—NanoHoldings LLC) (7 pages).
Notice of Reasons for Rejection dated Jan. 20, 2016 for application JP 2014-500489, filed on Mar. 25, 2011 (Applicant—NanoHoldings, LLC) (Original—3 pages // Translation—2 pages).
Notice of Reasons for Rejection dated Mar. 8, 2016 for application JP 2013-530819, filed on Sep. 30, 2011 and published as JP 2013-538686 (Applicant—NanoHoldings, LLC) (Original—5 pages // Translation—5 pages).
Fouth Office Action dated Mar. 2, 2016 by the State Intellectual Property Office of the People's Republic of China for Chinese Patent Application No. 201180037560.9, which was filed on Jun. 2, 2011 and published as CN103179861 dated Jun. 26, 2013 (Inventor—Pradeep et al.; Applicant—NanoHoldings LLC) (Original 11 pages// Translation—9 pages).
Notice of Reasons for Rejection dated Mar. 9, 2016 for application JP 2014-508886, filed on Jun. 22, 2012 and published as JP 2014516775 (Applicant—NanoHoldings, LLC) (Original—5 pages // Translation—4 pages).
Final Office Action dated Mar. 24, 2016 by the U.S. Patent and Trademark Office for U.S. Appl. No. 13/701,561, filed Feb. 19, 2013 and published as US 2013/0168320 dated Jul. 4, 2013 (Inventor—Pradeep et al.; Applicant—NanoHoldings LLC) (51 pages).
Second Office Action was dated Apr. 19, 2016 by the State Intellectual Property Office of the People's Republic of China for Chinese Application No. 2012800612986, filed on Nov. 20, 2012 and published as 104168996 dated Nov. 26, 2014 (Inventor—Pradhan et al; Applicant—Indian Institute of Technology).
Third Office Action was dated Apr. 25, 2016 by the State Intellectual Property Office of the People's Republic of China for Chinese Application No. 2012800258421, filed on Apr. 10, 2012 and published as CN103764245A dated Apr. 30, 2014 (Inventor—Pradhan et al; Applicant—NanoHoldings, LLC) (Original—9 pages // Translated—15 pages).
Final Rejection was dated May 27, 2016 by the U.S. Patent and Trademark Office for U.S. Appl. No. 14/110,424, filed Feb. 21, 2014 and published as US 2014-0158625 A1 dated Jun. 12, 2014 (Inventor—Pradhan et al) (4 pages).
Final Rejection was dated Jun. 10, 2016 by the U.S. Patent and Trademark Office for U.S. Appl. No. 13/877,294, filed Jul. 11, 2013 and published as US-2013-0292323-A1 dated Nov. 7, 2013 (Inventor—Pradeep, et al) (15 pages).
Second Office Action was dated Jun. 13, 2016 by the State Intellectual Property Office of the People's Republic of China for Chinese Application No. 201380025718X, filed on Apr. 17, 2013

(56) References Cited

OTHER PUBLICATIONS and published as 104520706 dated Apr. 15, 2015 (Inventor—Pradeep et al; Applicant—Indian Institute of Technology) (3 pages).
Final Rejection was dated Jul. 14, 2016 by the U.S. Patent and Trademark Office for U.S. Appl. No. 14/007,295, filed Mar. 27, 2014 and published as US 2014-0202943 A1 dated Jul. 24, 2014 (Inventor—Pradeep, et al) (21 pages).
Non-Final Rejection dated Sep. 24, 2015 by the U.S. Patent and Trademark Office for U.S. Appl. No. 13/820,403, filed May 14, 2014 and published as US 2013-0240439 dated Sep. 19, 2013 (Inventor—Pradeep, et al) (14 pages).
Response to Non-Final Rejection filed on Mar. 24, 2016 for U.S. Appl. No. 13/820,403, filed May 14, 2014 and published as US 2013-0240439 dated Sep. 19, 2013 (Inventor—Pradeep, et al) (9 pages).
Final Rejection dated Jul. 27, 2016 by the U.S. Patent and Trademark Office for U.S. Appl. No. 13/820,403, filed May 14, 2014 and published as US 2013-0240439 dated Sep. 19, 2013 (Inventor—Pradeep, et al) (14 pages).
Patent Examination Report No. 1, dated Jul. 21, 2106 by the IP Office of Australia for application 2012342118, filed on Nov. 20, 2012 (Inventor—Pradeep et al; Applicant—Indian Institute of Technology) (3 pages).
Examination Report issued by the GCC Patent Office dated Mar. 21, 2016 for Application No. 2013-23735, filed on Mar. 3, 2013 (Inventor—Pradhan et al; Applicant—Indian Institute of Technology) (9 pages).
Non Final Rejection was dated Apr. 26, 2016 by the U.S. Patent and Trademark Office for U.S. Appl. No. 14/394,825, filed Oct. 16, 2014 and published as US-2015-0132856-A1 dated May 14, 2015 (Inventor—Pradeep et al; Applicant—Indian Institute of Technology) (8 pages).
Decision of Rejection dated Oct. 27, 2016 by the State Intellectual Property Office of People's Republic of China for Patent Application No. 2012800258421, filed Apr. 10, 2012 and published as CN103764245 dated Apr. 30, 2014 (Inventor—Pradhan et al.; Applicant NanoHoldings, LLC; (Original—10 pages; Translation—13 pages).
Fourth Office Action dated Oct. 21, 2016, by the State Intellectual Property Office of the People's Republic of China for Chinese Patent Application No. 2011800529433, filed Sep. 2, 2011 and published as CN103298550 dated Sep. 11, 2013 (Inventor—Pradeep et al.; Applicant—NanoHoldings LLC; (Original 8 pages // Translation—12 pages).
Notice of Reasons for Rejection dated Sep. 14, 2016, for application JP 2014-500489, filed Mar. 25, 2011 (Applicant—NanoHoldings, LLC) (Original—2 pages // Translation—2 pages).
Final Office Action issued by the U.S. Patent and Trademark Office dated Sep. 13, 2016, for U.S. Appl. No. 14/115,591, filed Dec. 2, 2013 and published as US 2014/0216993 dated Aug. 7, 2014 (Inventor—Pradeep et al.; Applicant—NanoHoldings LLC; (12 pages).
Shen, Z. et al., Water-Soluble Fluorescent Ag Nanoclusters Obtained from Multiarm Star Poly(acrylic acid) as "Molecular Hydrogel" Templates. Adv Mater. 2007; 19:349-52.
Zhou, X. et al., In Situ Synthesis of Metal Nanoparticles on Single-Layer Graphene Oxide and Reduced Graphene Oxide Surfaces. J Phys Chem C. 2009; 113(25):10842-6.
Examination Report No. 1 dated Jun. 7, 2016 by the Intellectual Property Office of Australia for Patent Application No. 2012243079, filed Oct. 7, 2013 and dated Sep. 28, 2017 (Inventor—Pradhan et al.; Applicant—NanoHoldings, LLC; (3 pages.).
Notice of Acceptance dated Jun. 6, 2017 by the Intellectual Property Office of Australia for Patent Application No. 2012243079, filed Oct. 7, 2013 and dated Sep. 28, 2017 (Inventor—Pradhan et al.; Applicant—NanoHoldings, LLC; (3 pages).
Certificate of Patent dated Sep. 28, 2017 by the Intellectual Property Office of Australia for Patent Application No. 2012243079, filed Oct. 7, 2013 (Inventor—Pradhan et al.; Applicant—NanoHoldings, LLC; (1 page).

Decision of Rejection dated Oct. 27, 2016 by the State Intellectual Property Office of the People's republic of China for Patent Application No. 2012800258421, filed Nov. 27, 2013 (Inventor—Pradhan et al.; Applicant—NanoHoldings, LLC; (Original—10 pages.; Translation—13 pages).
First Office Action dated Sep. 25, 2015 by the Mexican Patent Office for Patent Application No. MX/a/2013/011745, filed Oct. 9, 2013 and granted as MX 347341 dated Apr. 21, 2017 (Inventor—Pradhan et al.; Applicant—NanoHoldings, LLC; (Original—3 pages.; Translation—4 pages).
Second Office Action dated Mar. 22, 2016 by the Mexican Patent Office for Patent Application No. MX/a/2013/011745, filed Oct. 9, 2013 and granted as MX 347341 dated Apr. 21, 2017 (Inventor—Pradhan et al.; Applicant—NanoHoldings, LLC; (Original—3 pages; Translation- 3 pages).
Third Office Action dated Oct. 14, 2016 by the Mexican Patent Office for Patent Application No. MX/a/2013/011745, filed Oct. 9, 2013 and granted as MX 347341 dated Apr. 21, 2017 (Inventor—Pradhan et al.; Applicant—NanoHoldings, LLC; (Original—3 pages; Translation—3 pages).
Certificate of Patent dated Apr. 21, 2017 by the Mexican Patent Office for Patent Application No. MX/a/2013/011745, filed Oct. 9, 2013 and granted as MX 347341 dated Apr. 21, 2017 (Inventor—Pradhan et al.; Applicant—NanoHoldings, LLC; ( 1 page).
Notice of Appeal Filed filed Nov. 28, 2016 by the U.S. Patent and Trademark Office for U.S. Appl. No. 14/110,424, filed Feb. 21, 2014 and published as U.S. 2014/0158625 dated Jun. 12, 2014 (Inventor—Pradhan et al.; Applicant—NanoHoldings, LLC; (2 pages).
Notice of Abandonment dated Jul. 11, 2017 by the U.S. Patent and Trademark Office for U.S. Appl. No. 14/110,424, filed on Feb. 21, 2014 and published as U.S. 2014/0158625 dated Jun. 12, 2014 (Inventor—Pradhan et al.; Applicant—NanoHoldings, LLC; (2 pages.).
Decision of Rejection dated Oct. 17, 2016 by the State Intellectual Property Office of the People's republic of China for Patent Application No. 2012800258421, filed Nov. 27, 2013 and published as CN103764245 dated Apr. 30, 2014 (Inventor—Pradhan et al.; Applicant—NanoHoldings, LLC; (Original—12 pages; Translation—8 pages.).
Office Action dated Sep. 8, 2015 by the Japanese Patent Office for Patent Application No. 2013-513004, filed Dec. 3, 2012 and granted as JP 5908462 dated Apr. 1, 2016 (Inventor—Pradhan et al.; Applicant—NanoHoldings, LLC; (Translation Only—7 pages).
Certificate of Patent dated Apr. 1, 2016 by the Japanese Patent Office for Patent Application No. 2013-513004, filed Dec. 3, 2012 and granted as JP 5908462 dated Apr. 1, 2016 (Inventor—Pradhan et al.; Applicant—NanoHoldings, LLC; (3 pages).
Notice of Appeal Filed filed Sep. 26, 2016 by the U.S. Patent and Trademark Office for U.S. Appl. No. 13/701,561, filed Feb. 19, 2013 and published as U.S. 2013/0168320 dated Jul. 4, 2013 (Inventor—Pradeep et al.; Applicant—NanoHoldings, LLC; (2 pages).
Notice of Abandonment dated May 5, 2017 by the U.S. Patent and Trademark Office for Patent Application No. 13/701,561, filed Feb. 19, 2013 and published as U.S. 2013/0168320 dated Jul. 4, 2013 (Inventor—Pradeep et al.; Applicant—NanoHoldings, LLC; (2 pages).
Preliminary Amendment filed Apr. 24, 2017 with the U.S. Patent and Trademark Office for U.S. Appl. No. 15/495,111, filed Apr. 24, 2017 (Inventor—Pradeep et al.; Applicant—NanoHoldings, LLC; (7 pages).
Notice of Abandonment dated Jan. 4, 2018 by the U.S. Patent and Trademark Office for U.S. Appl. No. 15/495,111, filed Apr. 24, 2017 (Inventor—Pradeep et al.; Applicant—NanoHoldings, LLC; (2 pages).
Fifth Office Action dated Jul. 12, 2017 by the State Intellectual Property Office of the People's Republic of China for Patent Application No. 2011800529433, filed Sep. 2, 2011 and published as CN 103298550 dated Sep. 11, 2013 (Inventor—Pradeep et al.; Applicant—NanoHoldings, LLC; (Original—8 pages; Translation—8 pages).

(56) References Cited

OTHER PUBLICATIONS

Office Action dated Mar. 8, 2016 by the Japanese Patent Office for Patent Application No. 2013-526567, filed Sep. 2, 2011 (Inventor—Pradeep et al.; Applicant—NanoHoldings, LLC; (Translation Only—4 pages).
Final Rejection dated Oct. 5, 2016 by the Japanese Patent Office for Patent Application No. 2013-526567, filed Sep. 2, 2011 (Inventor—Pradeep et al.; Applicant—NanoHoldings, LLC; (Translation Only—4 pages).
Notice of Appeal Filed filed Jan. 26, 2017 with the U.S. Patent and Trademark Office for U.S. Appl. No. 13/820,403, filed May 14, 2013 and published as U.S. 2013/0240439 dated Sep. 19, 2013 (Inventor—Pradeep et al.; Applicant—NanoHoldings, LLC; (2 pages).
Notice of Abandonment dated Oct. 6, 2017 by the U.S. Patent and Trademark Office for Patent Application No. 13/820,403, filed May 14, 2013 and published as U.S. 2013/0240439 dated Sep. 19, 2013 (Inventor—Pradeep et al.; Applicant—NanoHoldings, LLC; (2 pages).
Preliminary Amendment filed Aug. 25, 2017 with the U.S. Patent and Trademark Office for U.S. Appl. No. 15/686,294, filed Aug. 25, 2017 (Inventor—Pradeep et al.; Applicant—Indian Institute of Technology; (20 pages).
Decision of Rejection dated Jun. 7, 2016 by the State Intellectual Property Office of the People's Republic of China for Patent Application No. 2011800509092, filed Sep. 30, 2011 and published as CN 103339067 dated Oct. 2, 2013 (Inventor—Pradeep et al.; Applicant—NanoHoldings, LLC; (Original—8 pages; Translation—2 pages).
Office Action dated Mar. 21, 2016 by the Israeli Patent Office for Patent Application No. 225524, filed Sep. 30, 2011 (Inventor—Pradeep et al.; Applicant—NanoHoldings, LLC; (Original—2 pages; Translation—3 pages).
Final Rejection dated Aug. 29, 2016 by the Japanese Patent Office for Patent Application No. 2013-530819, filed Sep. 30, 2011 and published as 2013-538686 dated Oct. 17, 2013 (Inventor—Pradeep et al.; Applicant—NanoHoldings, LLC; (Original—3 pages; Translation—2 pages).
Notice of Appeal Filed filed Dec. 12, 2016 with the U.S. Patent and Trademark Office for U.S. Appl. No. 13/877,294, filed Jul. 11, 2013 and published as U.S. 2013/0292323 dated Nov. 7, 2013 (Inventor—Pradeep et al.; Applicant—NanoHoldings, LLC; (2 pages).
Notice of Abandonment dated Jul. 20, 2017 by the U.S. Patent and Trademark Office for U.S. Appl. No. 13/877,294, filed on Jul. 11, 2013 and published as U.S. 2013/0292323 dated Nov. 7, 2013 (Inventor—Pradeep et al.; Applicant—NanoHoldings, LLC; (2 pages).
Examination Report No. 1 dated Jun. 1, 2016 by the Intellectual Property Office of Australia for Patent Application No. 2012241522, filed Mar. 23, 2012 and dated Sep. 21, 2017 (Inventor—Pradeep et al.; Applicant—Indian Institute of Technology; (3 pages).
Notice of Acceptance dated May 25, 2017 by the Intellectual Property Office of Australia for Patent Application No. 2012241522, filed Mar. 23, 2012 and granted on Sep. 21, 2017 (Inventor—Pradeep et al.; Applicant—Indian Institute of Technology; (3 pages).
Certificate of Patent dated Sep. 21, 2017 by the Intellectual Property Office of Australia for Patent Application No. 2012241522, filed Mar. 23, 2012 and dated Sep. 21, 2017 (Inventor—Pradeep et al.; Applicant—Indian Institute of Technology; (1 page).
Certificate of Patent dated Nov. 23, 2016 by the State Intellectual Property Office of the People's Republic of China for Patent Application No. 201280021921.5, filed Mar. 23, 2012 and granted as CN103702730 dated Nov. 23, 2016 (Inventor—Pradeep et al.; Applicant—Indian Institute of Technology; (1 page).
Certificate of Patent dated Aug. 10, 2017 by the Japanese Patent Office for Patent Application No. 2014-500489, filed Mar. 23, 2012 and granted as 6188676 dated Aug. 10, 2017 (Inventor—Pradeep et al.; Applicant—Indian Institute of Technology; (3 pages).
Examination Report dated Jul. 1, 2016 by the Intellectual Property Office of Singapore for Patent Application No. 20130702053, filed Mar. 23, 2012 and granted as 193947 dated Oct. 4, 2016 (Inventor—Pradeep et al.; Applicant—Indian Institute of Technology; (13 pages).
Certificate of Grant dated Oct. 4, 2016 by the Intellectual Property Office of Singapore for Patent Application No. 20130702053, filed Mar. 23, 2012 and granted as 193947 dated Oct. 4, 2016 (Inventor—Pradeep et al.; Applicant—Indian Institute of Technology; (1 page).
Notice of Appeal Filed filed Jan. 17, 2017 with the U.S. Patent and Trademark Office for U.S. Appl. No. 14/007,295, filed Mar. 27, 2014 and published as U.S. 2014/0202943 dated Jul. 24, 2014 (Inventor—Pradeep et al.; Applicant—Indian Institute of Technology; (2 pages).
Notice of Abandonment dated Aug. 23, 2017 by the U.S. Patent and Trademark Office for U.S. Appl. No. 14/007,295, filed Mar. 27, 2014 and published as U.S. 2014/0202943 dated Jul. 24, 2014 (Inventor—Pradeep et al.; Applicant—Indian Institute of Technology; (2 pages).
Preliminary Amendment filed Aug. 15, 2017 with the U.S. Patent and Trademark Office for U.S. Appl. No. 15/677,618, filed Aug. 15, 2017 (Inventor—Pradeep et al.; Applicant—Indian Institute of Technology; (4 pages).
Second Office Action dated Sep. 17, 2015 by the State Intellectual Property Office of the People's Republic of China for Patent Application No. 201280024789.3, filed Jun. 22, 2012 and granted as CN103747683 dated Feb. 15, 2017 (Inventor—Pradeep et al.; Applicant—Indian Institute of Technology; (Original—9 pages; Translation—10 pages).
Third Office Action dated Mar. 21, 2016 by the State Intellectual Property Office of the People's Republic of China for Patent Application No. 201280024789.3, filed Jun. 22, 2012 and granted as CN103747683 dated Feb. 15, 2017 (Inventor—Pradeep et al.; Applicant—Indian Institute of Technology; Original—4 pages; Translation—7 pages).
Certificate of Patent dated Feb. 14, 2017 by the State Intellectual Property Office of the People's Republic of China for Patent Application No. 201280024789.3, filed Jun. 22, 2012 and granted as CN103747683 dated Feb. 15, 2017 (Inventor—Pradeep et al.; Applicant—Indian Institute of Technology; (1 page).
Second Examination Report dated Dec. 27, 2015 by the Israeli Patent Office for Patent Application No. 229223, filed Jun. 22, 2012 and dated Mar. 30, 2017 (Inventor—Pradeep et al.; Applicant—Indian Institute of Technology; (Translation Only—2 pages).
Certificate of Patent dated Mar. 30, 2017 by the Israeli Patent Office for Patent Application No. 229223, filed Jun. 22, 2012 and dated Mar. 30, 2017 (Inventor—Pradeep et al.; Applicant—Indian Institute of Technology; (1 page).
Notice of Appeal Filed filed Mar. 10, 2017 with the U.S. Patent and Trademark Office for U.S. Appl. No. 14/115,591, filed on Dec. 2, 2013 and published as U.S. 2014/0216993 dated Aug. 7, 2014 (Inventor—Pradeep et al.; Applicant—Indian Institute of Technology; (2 pages).
Notice of Abandonment dated Nov. 22, 2017 by the U.S. Patent and Trademark Office for U.S. Appl. No. 14/115,591, filed Dec. 2, 2013 and published as U.S. 2014/0216993 dated Aug. 7, 2014 (Inventor—Pradeep et al.; Applicant—Indian Institute of Technology; (2 pages).
Preliminary Amendment filed Oct. 10, 2017 with the U.S. Patent and Trademark Office for U.S. Appl. No. 15/728,561, filed Oct. 10, 2017 (Inventor—Pradeep et al.; Applicant—Indian Institute of Technology; (3 pages).
Notice of Acceptance dated Jul. 28, 2017 by the Intellectual Property Office of Australia for Patent Application No. 2012342118, filed Nov. 20, 2012 (Inventor—Pradeep et al.; Applicant—Indian Institute of Technology; (3 pages).
Second Office Action dated Apr. 19, 2016 by the State Intellectual Property Office of the People's Republic of China for Patent Application No. 201280061298.6, filed Nov. 20, 2012 and granted on Mar. 15, 2017 (Inventor—Pradeep et al.; Applicant—Indian Institute of Technology; (Original—3 pages; Translation—5 pages).
Certificate of Patent dated Mar. 15, 2017 by the State Intellectual Property Office of the People's Republic of China for Patent

(56) References Cited

OTHER PUBLICATIONS

Application No. 201280061298.6, filed Nov. 20, 2012 and dated Mar. 15, 2017 (Inventor—Pradeep et al.; Applicant—Indian Institute of Technology; (1 page).
Second Examination Report dated Feb. 20, 2017 by the Patent Office of the Cooperation Council for the Arab States of the Gulf for Patent Application No. GC 2013-23735, filed Mar. 3, 2013 (Inventor—Pradeep et al.; Applicant—Indian Institute of Technology; (Translation Only—4 pages).
Office Action dated Nov. 14, 2016 by the Japanese Patent Office for Patent Application No. 2014-542953, filed Nov. 20, 2012 (Inventor—Pradeep et al.; Applicant—Indian Institute of Technology; (Translation Only—10 pages).
Certificate of Grant dated Mar. 1, 2017 by the State Intellectual Property Office of the People's Republic of China for Patent Application No. ZL 201380025718.X, filed Apr. 17, 2013 and dated Mar. 1, 2017 (Inventor—Pradeep et al.; Applicant—Indian Institute of Technology; (1 page).
Notice of Reason for Refusal dated May 1, 2017 by the Japanese Patent Office for Patent Application No. 2015-506324, filed Apr. 17, 2013 (Inventor—Pradeep et al.; Applicant—Indian Institute of Technology; (Original—2 pages; Translation—2 pages).
Response to Non-Final Office Action filed Oct. 26, 2016 with the U.S. Patent and Trademark Office for U.S. Appl. No. 14/394,825, filed Oct. 16, 2014 and published as U.S. 2015/0132856 dated May 14, 2015 (Inventor—Pradeep et al.; Applicant—Indian Institute of Technology; (12 pages).
Notice of Allowance dated Dec. 5, 2016 by the U.S. Patent and Trademark Office for U.S. Appl. No. 14/394,825, filed Oct. 16, 2014 and published as U.S. 2015/0132856 dated May 14, 2015 (Inventor—Pradeep et al.; Applicant—Indian Institute of Technology; (8 pages).
Notice of Allowance dated Dec. 30, 2016 by the U.S. Patent and Trademark Office for U.S. Appl. No. 14/394,825, filed Oct. 16, 2014 and published as U.S. 2015/0132856 dated May 14, 2015 (Inventor—Pradeep et al.; Applicant—Indian Institute of Technology; (5 pages).
Notice of Allowance dated Jul. 21, 2017 by the U.S. Patent and Trademark Office for U.S. Appl. No. 14/394,825, filed Oct. 16, 2014 and published as U.S. 2015/0132856 dated May 14, 2015 (Inventor—Pradeep et al.; Applicant—Indian Institute of Technology; (7 pages).
Notice of Allowance dated Dec. 6, 2017 by the U.S. Patent and Trademark Office for U.S. Appl. No. 14/394,825, filed Oct. 16, 2014 and published as U.S. 2015/0132856 dated May 14, 2015 (Inventor—Pradeep et al.; Applicant—Indian Institute of Technology; (7 pages).
Examination Report No. 1 dated Apr. 24, 2017 by the Intellectual Property Office of Australia for Patent Application No. 2014338691, filed Jun. 27, 2014 (Inventor—Pradeep et al.; Applicant—Indian Institute of Technology; (4 pages).
Search Report dated Jun. 28, 2017 by the State Intellectual Property Office of the People's Republic of China for Patent Application No. 201480045660, filed Jun. 27, 2014 (Inventor—Pradeep et al.; Applicant—Indian Institute of Technology; (2 pages).
First Office Action dated Jul. 3, 2017 by the State Intellectual Property Office of the People's Republic of China for Patent Application No. 201480045660, filed Jun. 27, 2014 (Inventor—Pradeep et al.; Applicant—Indian Institute of Technology; (Original—4 pages; Translation—6 pages).

International Search Report and Written Opinion dated Mar. 13, 2015 by the International Searching Authority for Patent Application No. PCT/182014/002316, filed Jun. 27, 2014 and published as WO 2015/059562 dated Apr. 30, 2015 (Inventor—Pradeep et al.; Applicant—Indian Institute of Technology; (8 pages).
International Preliminary Report on Patentability dated Dec. 29, 2015 by the International Searching Authority for Patent Application No. PCT/182014/002316, filed Jun. 27, 2014 and published as WO 2015/059562 dated Apr. 30, 2015 (Inventor—Pradeep et al.; Applicant—Indian Institute of Technology; (6 pages).
Search Report completed on Jun. 15, 2016 by the Intellectual Property Office of Singapore for Patent Application No. 11201510632W, filed Jun. 27, 2014 (Inventor—Pradeepet al.; Applicant—Indian Institute of Technology; (3 pages).
Written Opinion dated Aug. 30, 2016 by the Intellectual Property Office of Singapore for Patent Application No. 11201510632W, filed Jun. 27, 2014 (Inventor—Pradeep et al.; Applicant—Indian Institute of Technology; (7 pages).
Examination Report dated Apr. 10, 2017 by the Intellectual Property Office of Singapore for Patent Application No. 11201510632W, filed Jun. 27, 2014 (Inventor—Pradeep et al.; Applicant—Indian Institute of Technology; (4 pages).
Certificate of Patent dated Nov. 28, 2017 by the Intellectual Property Office of Singapore for Patent Application No. 11201510632W, filed Jun. 27, 2014 (Inventor—Pradeep et al.; Applicant—Indian Institute of Technology; (1 page).
Preliminary Amendment filed Dec. 22, 2015 with the U.S. Patent and Trademark Office for U.S. Appl. No. 14/900,740, filed Dec. 22, 2015 and published as U.S. 2016/0135468 dated May 19, 2016 (Inventor—Pradeep et al.; Applicant—Indian Institute of Technology; (6 pages).
Examination Report and Search Report dated Mar. 12, 2018 by the United Arab Emirates Ministry of Economy for Patent Application No. 1161/2013, filed Oct. 31, 2013 (Inventor—Pradeep et al.; Applicant—Indian Institute of Technology; (11 pages).
Notice of Allowance dated Mar. 28, 2018 by the U.S. Patent and Trademark Office for U.S. Appl. No. 14/394,825, filed on Oct. 16, 2014 and published as U.S. 2015/0132856 dated May 14, 2015 (Inventor—Pradeep et al.; Applicant—Indian Institute of Technology; (7 pages).
Office Action dated Apr. 9, 2018 by the Japanese Patent Office for Patent Application No. 2016-522896, filed Feb. 25, 2016 and published as 2016-523284 dated Aug. 8, 2016 (Inventor—Pradeep et al.; Applicant—Indian Institute of Technology; (Original—6 pages; Translation—9 pages).
Restriction Requirement dated Mar. 16, 2018 by the U.S. Patent and Trademark Office for U.S. Appl. No. 14/900,740, filed Dec. 22, 2015 and published as U.S. 2016/0135468 dated May 19, 2016 (Inventor—Pradeep et al.; Applicant—Indian Institute of Technology; (10 pages).
Response to Restriction Requirement filed May 16, 2018 with the U.S. Patent and Trademark Office for U.S. Appl. No. 14/900,740, filed Dec. 22, 2015 and published as U.S. 2016/0135468 dated May 19, 2016 (Inventor—Pradeep et al.; Applicant—Indian Institute of Technology; (3 pages).
Non-Final Office Action dated May 31, 2018 by the U.S. Patent and Trademark Office for U.S. Appl. No. 14/900,740, filed Dec. 22, 2015 and published as U.S. 2016/0135468 dated May 19, 2016 (Inventor—Pradeep et al.; Applicant—Indian Institute of Technology; (13 pages).

\* cited by examiner

MULTILAYER ORGANIC-TEMPLATED-BOEHMITE-NANOARCHITECTURE FOR WATER PURIFICATION

CROSS-REFERENCE TO RELATED APPLICATIONS

The present application is a U.S. National Phase Application of International Application No. PCT/IB2012/002885, filed Nov. 20, 2012, which claims priority to Indian Patent Application No. 4062/CHE/2011, filed Nov. 24, 2011, both of which applications are incorporated herein fully by this reference.

BACKGROUND

Technical Field

The present disclosure relates to the field of water purification and specifically to an organic-templated-boehmite-nanoarchitecture (OTBN) used for water purification.

Technical Background

Availability of clean drinking water is a major health concern across the world, especially in the developing and under-developed countries. Amongst the major contaminants which contaminate water, the major ones include biological (e.g. bacteria and virus), inorganic (e.g. fluoride, arsenic, iron) and organic (e.g. pesticides, volatile organics) species. Various governmental initiatives across the world continue to support the projects to ensure availability of clean drinking water to the people of respective countries. However, it continues to be a major problem because technological costs, in many cases, continue to stay above affordable limit which eventually affects the poor as they are unable to afford clean drinking water.

The fact that poor continues to suffer due to un-availability of clean drinking water is common across various statistics collected by various sources. It is therefore important to make a technological intervention to improve the affordability of available state-of-the-art technologies. This can go a long way in improving the health of people globally.

Aluminum-based compositions have been exhaustively studied for the removal of inorganic anions, such as fluorides and arsenates from drinking water. Use of aluminum-based compositions is more pertinent for fluoride adsorption from water due to its relatively higher fluoride adsorption capacity vis-à-vis other adsorbents. Moreover, aluminum-based compositions do not require any additional pre/post-filtration. Various improvements in the capacity of aluminum-based compositions have been proposed till date. Practically, all aluminum-based compositions in the field use require frequent regeneration, largely to reduce the cost of water purification. However, traditionally followed practice of regeneration, i.e., alkali treatment followed by acidification, leads to secondary contamination of water sources caused due to high fluoride concentration in the sludge, leaching of aluminum in water and high dissolved salt content of the sludge. Prior art related to fluoride removal using aluminum-based compositions and associated challenges are covered in detail in our previous Indian patent application 1529/CHE/2010, entire contents of which are herein incorporated by reference.

The Indian patent application 1529/CHE/2010 describes a method to produce aluminum oxyhydroxide-chitosan composite at room temperature. There are a number of advantages in the adsorbent composition, including green chemistry based preparation at room temperature, binder free granulation, ease of filter-ability/wash-ability and an easy-to-adapt method for preparation of mixed metal hydroxides/oxides.

It was reported that an adsorbent dose of 500 mg/L is sufficient to remove fluoride concentration below 0.5 ppm, when input fluoride is varied from 1-10 mg/L. The aluminum oxyhydroxide-chitosan composite exhibits a fluoride adsorption capacity of over 53 mg/g at an initial fluoride concentration of 10 mg/L in deionized water. Owing to the presence of competing anions in ground water, the fluoride adsorption capacity of the composition diminishes and an adsorbent dose of 1.5 g/L is required to remove fluoride concentration below 0.5 ppm, when input fluoride concentration in ground water is varied from 1-10 mg/L. Cost of the material is approximately Indian Rupees 350 per kg. This translates to a material cost of Indian Rupees 5 per 10 L (assuming a household requires 10 L of fluoride free drinking water per day).

Further, the following prior art documents have attempted to develop various fluoride removal techniques using aluminum and/or chitosan based compositions:

1. Miretzky P., Cirelli A. F., Fluoride removal from water by chitosan derivatives and composites: A review, Journal of Fluorine Chemistry 132 (2011) 231-240;
2. Jagtap S., Yenkie M. K., Das S., Rayalu S., Synthesis and characterization of lanthanum impregnated chitosan flakes for fluoride removal in water, Desalination 273 (2011) 267-275;
3. Fluoride removal from water by adsorption—A review, Bhatnagar A., Kumar E., Mika Sillanpää M., Chemical Engineering Journal, 171 (2011) 811-840; and
4. Liu R., Gong W., Lan H., Gao Y., Liu H., Qu J., Defluoridation by freshly prepared aluminum hydroxides, 175 (2011) 144-149.

While the prior art methods and compositions are effective in fluoride removal from water to a large extent, there exists a scope for improvement. For example, even the reduced cost of the adsorbent composition is still too high for some of the Indian households. Mainly, it is expected that the water purification composition satisfies the following conditions:

Firstly, the adsorbent composition should be implementable at the household level, i.e., it should exhibit high adsorption kinetics and low empty bed contact time. Secondly, the adsorbent composition should require no regeneration, and thus should not generate any secondary contamination. Thirdly, the adsorbent composition should be easy-to-use and maintain, i.e., it should not require any pre/post-filtration. Fourthly, the adsorbent dose should be able to reduce any input concentration that is below 10 ppm to below 1 ppm, as per the Indian National Sanitation Foundation norm for water to be used for fluoride removal. Finally and most importantly, the cost of water purification should not exceed Indian Rupees 3 per 10 L of purified water (i.e., the composition should be affordable) and the quantity of adsorbent should not exceed 2-3 g per 10 L of purified water.

In light of the foregoing discussion, there exists a need to address the aforementioned problems and other shortcomings associated with the prior art methods and compositions. These needs and other needs are satisfied by the water purification composition of the present disclosure. Considering the widespread contamination of fluoride across the globe, the water purification composition of the present invention will have a major positive effect on the health of the society as it can be used to provide point-of-use water filters.

SUMMARY

In accordance with the purpose(s) of the invention, as embodied and broadly described herein, this disclosure, in one aspect, relates to water purification. Particularly, the disclosure relates to a nanoscale shell of metal oxide/hydroxide on an organic-templated-boehmite-nanoarchitecture.

An object of the present invention is to provide an adsorption composite that exhibits high adsorption kinetics and low empty bed contact time, and that is easily implementable at a household level.

Another object of the present invention is to provide an adsorption composite that requires no regeneration and thus has no secondary contamination.

Yet another object of the present invention is to provide an adsorbent composition that is easy-to-use and maintain, i.e., the adsorption composition should not require any pre/post-filtration.

Yet another object of the present invention is to provide an adsorbent dose that is able to reduce any input concentration that is below 10 ppm to below 1 ppm.

Still another object of the present invention is minimize the cost of water purification to less than Indian Rupees 3 per 10 L of purified water, and to minimize the quantity of adsorbent to 2-3 g per 10 L of purified water.

In one aspect, an adsorbent composition for the removal of fluoride from water is provided. The adsorption composition includes a nanoscale shell of metal oxyhydroxide/hydroxide/oxide on organic-templated-boehmite-nanoarchitecture (OTBN, referred to as 'core'). The size of the shell is less than about 3 nm, which exhibits high anion adsorption capacity from water. Preparation of nanoscale metal hydroxide of size less than about 3 nm is achieved by precipitation of metal ion on the surface of OTBN. Highest fluoride adsorption capacity is achieved when weight ratio of aluminum in shell to aluminum in core ($Al_{shell}:Al_{core}$) reaches 90%. Consequently, a 100% improvement in the fluoride adsorption capacity is reported vis-à-vis OTBN.

In another aspect, an adsorbent dose of 0.75 g/L is required to remove fluoride concentration below 0.5 ppm, when input fluoride concentration in ground water is varied from 1-10 mg/L. This translates to a material cost of Indian Rupees 2.5 per 10 L of water; leading to 50% reduction in the material cost vis-à-vis earlier reported compositions.

In one aspect, a granular composite of nanoscale multi-layer metal oxyhydroxide ("shell") on OTBN ("core") is provided. The granular composite is prepared by formation of multi-layer on OTBN in gel form. In another aspect, the granular composite is prepared by the formation of a multi-layer on OTBN in the solid form.

In another aspect, the present disclosure provides a method for preparation of nanoscale metal oxide/hydroxide/oxyhydroxide shell on OTBN. In a general aspect, the method includes contacting a metal precursor with the OTBN in gel state in aqueous medium and then contacting the resulting mixture with a base. In another aspect, the metal precursor in the aqueous medium is contacted with OTBN in the solid state and the resulting mixture is contacted with a base.

In various aspects, the metal precursor includes a salt of a metal or a solution thereof. In various aspects, the metal component includes aluminum, iron, titanium, manganese, cobalt, nickel, copper, silver, zinc, lanthanum, cerium, zirconium, calcium, magnesium, barium, or a combination thereof. In another aspect, the metal precursor includes a solution of an aluminum salt that includes aluminum sulfate. In another aspect, the metal precursor includes a solution of an aluminum salt that includes aluminum nitrate, aluminum acetate, aluminum chloride, aluminum isopropoxide, or a combination thereof. In another aspect, the metal precursor includes a mixture of two or more individual metal precursors in any desired ratio, such as, for example, from about 20:1 to about 1:20, and for example, about 20:1, 10:1, 5:1, 2:1, 1:1, 1:2, 1:5, 1:10, and 1:20.

The base used in the hydrolysis of metal precursor may include any suitable base, such as sodium hydroxide, ammonia, potassium hydroxide, or a combination thereof. In other aspects, other bases or combination of bases and/or solutions thereof can be used, and the present invention is not intended to be limited to a particular base. In one aspect, upon addition of the base to a mixture of metal precursor and OTBN, metal ions hydrolyze and precipitate in the form of a nanoscale layer on OTBN surface. Upon precipitation of metal precursor with the base, a semi-solid precipitate including nanoscale metal hydroxide/oxide/oxyhydroxide shell on OTBN is formed. In one aspect, the thickness of the resulting shell layer is in the range of about 1 nm to about 10 nm. In another aspect, the thickness of the resulting shell layer is in the range of from about 1 nm to about 5 nm. The semi-solid precipitate is typically subjected to filtration and washing with copious amounts of water followed by drying to obtain the desired granular composite.

In various aspects, the present invention provides methods for preparing nanoscale shell of metal oxide/hydroxide on OTBN. In another aspect, the composition can be used for the removal of inorganic anions from drinking water such as arsenic and fluoride.

Additional aspects and advantages of the invention will be set forth, in part, in the detailed description and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE FIGURES

The accompanying figures, which are incorporated in and constitute a part of this specification, illustrate several aspects and together with the description serve to explain the principles of the invention.

DESCRIPTION

Figure 1:
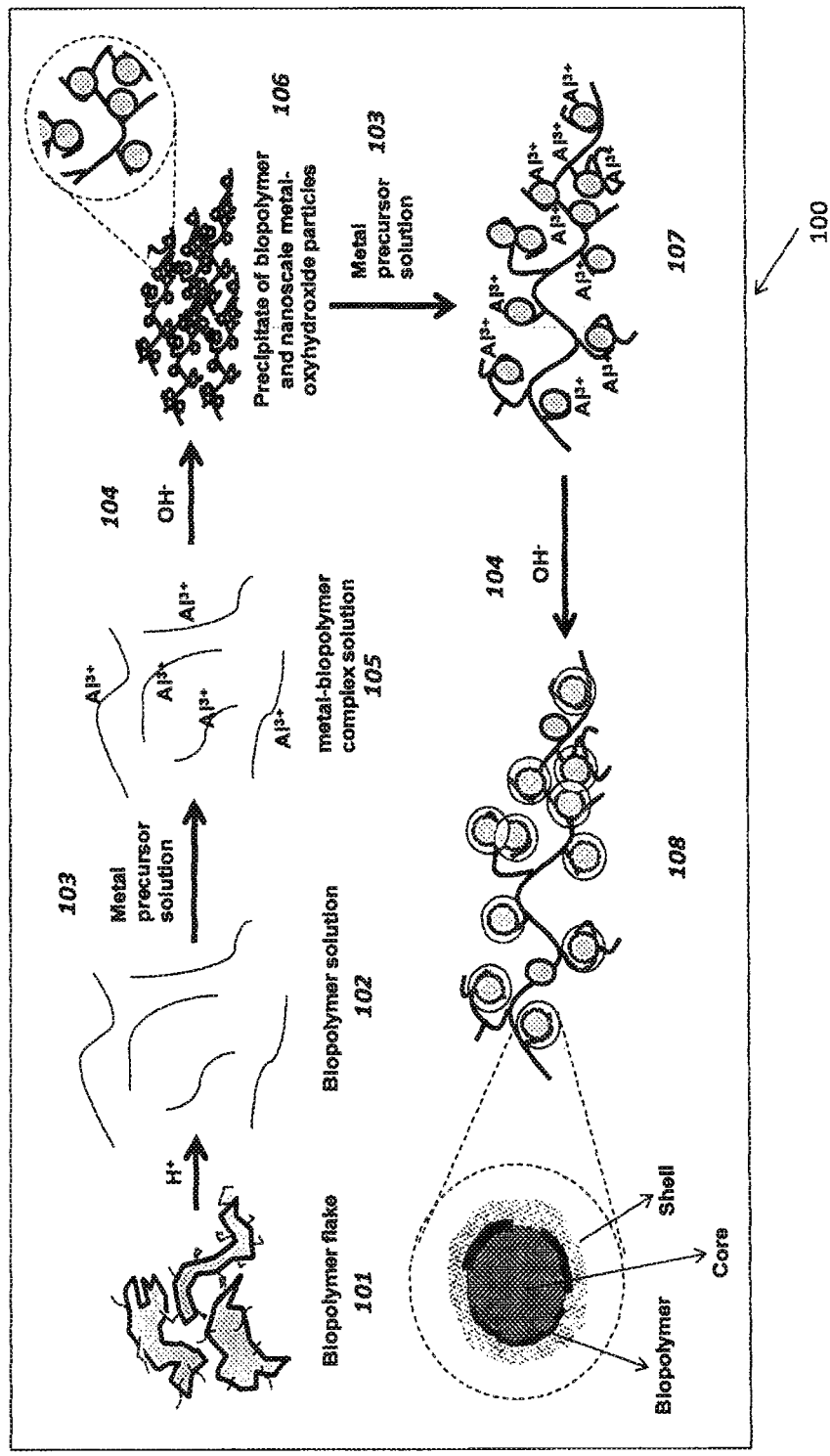
FIG. 1 is a schematic representation of chemical reactions involved in the method for preparation of composition, in accordance with an aspect of the present invention.

The present invention can be understood more readily by reference to the following detailed description of the invention and the examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a metal" includes mixtures of two or more metals.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result. Moreover, the result presented here should not be construed as limiting the scope of the invention.

Experimental Methods

Material Characterization

Identification of the phase(s) of the as-prepared samples was carried out by X-ray powder diffraction (Bruker AXS, D8 Discover, USA) using Cu-K$\alpha$ radiation at $\lambda$=1.5418 Å. High resolution Transmission Electron Microscopy (HR-TEM) images of the sample were obtained with JEM 3010 (JEOL, Japan). The samples prepared as above were spotted on amorphous carbon films supported on copper grids and dried at room temperature. X-ray Photoelectron Spectroscopic (XPS) analysis was carried out by using ESCA Probe TPD of Omicron Nanotechnology. Polychromatic Mg K$\alpha$ was used as the X-ray source (hv=1253.6 eV). Spectra in the required binding energy range were collected and an average was taken. Beam induced damage of the sample was reduced by adjusting the X-ray flux. Binding energy was calibrated with respect to C 1s at 284.5 eV. Surface morphology, elemental analysis and elemental mapping studies were carried out using a Scanning Electron Microscope (SEM) equipped with Energy Dispersive Analysis of X-rays (EDAX) (FEI Quanta 200). The sample was re-suspended in water by sonication for 10 min and drop casted on an indium tin oxide (ITO) conducting glass and dried.

Adsorption Studies

The adsorbent composition was tested for fluoride (in the form of NaF) removal from water. All uptake capacity studies were performed in a batch reactor (250 mL polypropylene conical flask). The working volume of the solution was taken as 100 mL and required quantity of adsorbent was added. The flasks were kept for shaking at 160± 5 rpm in an orbital shaker at room temperature. Samples were withdrawn at duration of 1.5 hour and analyzed for residual solute concentration.

The water used for studies was either deionized water or tap water (composition is mentioned herewith), and it is mentioned in the respective figures and the forthcoming description.

EXAMPLES

The present application describes the methods for preparing nanoscale shell of metal oxide/hydroxide on OTBN. The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention.

Example 1

This example describes the formation of aluminum hydroxide as a nanoscale layer on OTBN. OTBN was prepared as reported in the previous Indian patent application 1529/CHE/2010, entire contents of which are herein incorporated by reference. The OTBN gel obtained after washing the salt content was used for the formation of a nanoscale layer thereover. The OTBN gel was re-dispersed in water, to which aluminum precursor, such as aluminum sulfate was added drop-wise. The ratio of Al in the shell to Al in the core may be varied anywhere between 0.5-300%. After stirring the solution for 2 hours, aqueous sodium hydroxide (2 M NaOH) was added to the solution drop-wise so that the metal precursor was hydrolyzed. Then the solution was allowed to stir for half an hour, filtered, and washed with copious amounts of water. The obtained gel was then dried at room temperature for further studies.

Example 2

This example describes the formation of nanoscale multilayer metal oxide/hydroxide on OTBN, in accordance with an aspect of the present invention. 0.2 M aluminum precursor solution was slowly added to a diluted chitosan solution (0.75 g/L) with vigorous stirring for 60 minutes and was kept overnight without agitation. Thereafter, aqueous 2 M NaOH was slowly added in to the metal-chitosan solution with vigorous stirring to facilitate the precipitation of the metal-chitosan composites. The steps were carried out at a temperature below 30° C. The precipitate was filtered and washed with copious amount of water. The gel was then re-dispersed in water.

Thereafter, aluminum precursor solution was added to the above solution. The ratio of Al in the shell layer to Al in the core may be varied anywhere between 0.5-300%. After stirring the solution for 2 hours, aqueous sodium hydroxide (NaOH) was added to the solution drop-wise such that metal precursor underwent hydrolysis. The solution was then allowed to stir for half an hour, filtered, and washed with copious amounts of water. The obtained gel was then dried at room temperature for further studies.

Example 3

This example describes the formation of nanoscale metal oxide/hydroxide/oxyhydroxide shell on OTBN, in accordance with another aspect of the present invention. Precipitated chitosan solution was prepared by adding aqueous NaOH to chitosan solution. Aluminum precursor solution was slowly added to the precipitated chitosan solution with vigorous stirring for 60 minutes and was kept overnight without agitation. Thereafter, aqueous 2 M NaOH was slowly added to facilitate the hydrolysis of metal precursor in precipitated chitosan matrix. The steps were carried out at a temperature below 30° C. The precipitate was filtered and washed with copious amounts of water. The gel was then re-dispersed in water.

Thereafter, aluminum precursor solution was added to the above solution. The ratio of Al in the shell layer to Al in core may be varied anywhere between 0.5-300%. After stirring the solution for 2 hours, aqueous 2 M NaOH was added to the solution drop-wise such that metal precursor underwent hydrolysis reaction. Then the solution was allowed to stir for half an hour, filtered and washed with copious amounts of water. The obtained gel was then dried at room temperature for further studies.

Example 4

Dried OTBN powder was crushed to a particle size of 100-150 micron. The powder was stirred in the water, by using a shaker. Aluminum precursor solution was then slowly added thereto. The ratio of Al in the shell layer to Al in core may be varied anywhere between 0.5-300%. After stirring the mixture for 2 hours, aqueous 2 M NaOH was added drop-wise to hydrolyze the metal precursor. The mixture was allowed to stir for half an hour, filtered, and washed with copious amounts of water. The obtained powder was then dried at room temperature for further studies.

Example 5

This example describes the formation of a multi-layer of metal oxide/hydroxide on the core composition, in accordance with an aspect of the present invention. The composition as described in examples 1, 2 and 3 may be used, in the form of a gel or a powder. 1 M aluminum precursor was added drop-wise to the composition. After stirring the solution for an hour, 2 M NaOH was slowly added to hydrolyze the metal precursor. Subsequently, iron precursor was added drop-wise to the composition followed by hydrolysis using aqueous 2 M NaOH. The obtained composition was then filtered and washed with copious amounts of water. The composition was dried at room temperature for further studies.

If the core composition is designated as A, shell 1 composition is designated as B, shell 2 composition is designated as C, it will be apparent to those skilled in the art that compositions designated as AB, ABC, ACB, ABAB, ABCABC, or combinations thereof can be prepared by the steps described in this invention.

Example 6

This example describes the formation of multi-element multi-layer OTBN, in accordance with an aspect of the present invention. The composition as described in examples 1, 2 and 3 may be used, either in form of a gel or a powder. A homogeneous solution containing 0.5 M aluminum sulfate and 0.5 M ferric sulfate was added drop-wise to the composition. After stirring the solution for an hour, 2 M NaOH was slowly added to hydrolyze the metal precursors. The obtained composition was filtered and washed with copious amounts of water. The composition was dried at room temperature for further studies.

Example 7

This example describes the formation of ferric hydroxide as a nanoscale layer on the OTBN, in accordance with an aspect of the present invention. Methods of preparation as detailed in examples 1, 2 and 3 were used, wherein an iron(III) precursor, such as ferric sulfate was used. Subsequently, the metal precursor was hydrolyzed. Semi-solid precipitate was filtered, washed with copious amounts of water, and dried for further use.

Referring now to FIG. 1, a schematic representation of chemical reaction 100 involved in the method for preparation of composition, in accordance with an aspect of the present invention, is shown. A granular composite of OTBN is obtained through the reaction 100. The reaction 100 is initiated by preparing a biopolymer solution 102 of a biopolymer flake 101. Subsequently, a metal precursor solution 103 is added to the biopolymer solution 102 to obtain a metal-biopolymer complex solution 105. A base 104 is added to the metal-biopolymer complex solution 105 to obtain the composite of biopolymer and nanoscale metal-oxyhydroxide particles. Eventually, a semi solid precipitate 106 that includes nanoscale metal-oxyhydroxide particles aligned on chitosan is obtained, which is subsequently washed with copious amounts of water.

The filtered composite gel 106 is homogeneously dispersed in distilled water. Metal precursor solution 103 is then added to metal oxyhydroxide particles-biopolymer composite 106. Metal oxyhydroxide particles-biopolymer composite 106 and metal ions of metal precursor solution 103 interact with each other through a number of functional groups to obtain metal ion complexed metal oxyhydroxide particles-biopolymer composite 107. Further, a base 104 is added to the metal oxyhydroxide particles-biopolymer composite 107. Upon addition of the base 104, metal ions 103 hydrolyze and precipitate on metal oxyhydroxide particles-biopolymer composite 106 as core-shell particles. Eventually, a semi solid precipitate 108 that includes core-shell particles aligned on chitosan matrix is obtained. The precipitate 108 is washed with copious amounts of water and is dried at a temperature between 30-60° C.

Figure 2:
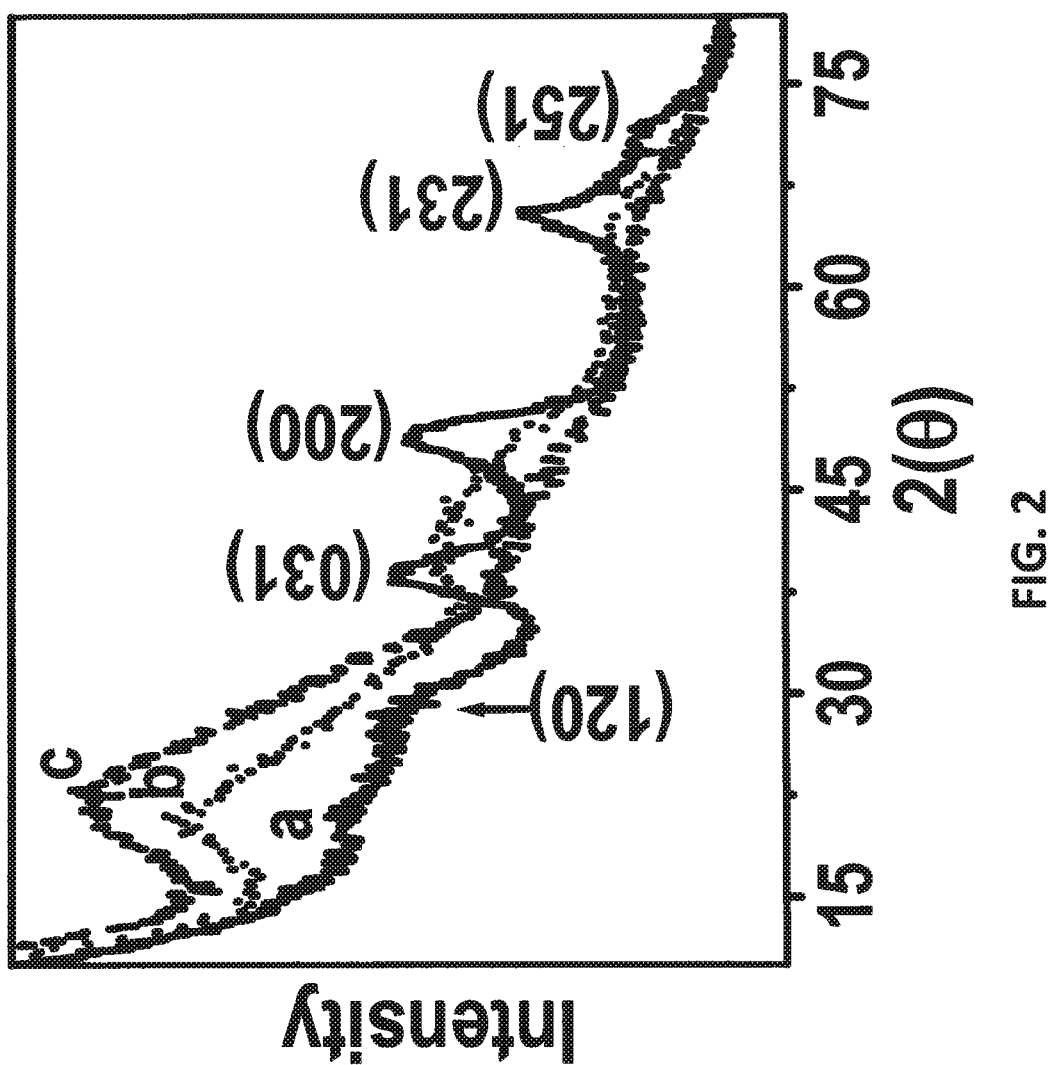
FIG. 2 depicts XRD patterns of (a) as-synthesized parent material OTBN (indexed to the standard reflections of AlOOH (JCPDS 21-1307)), (b) nanoscale aluminum hydroxide coated OTBN (ratio of Al content in shell to Al content in OTBN=0.45) and (c) nanoscale aluminum hydroxide coated on OTBN (ratio of Al content in shell to Al content in OTBN=0.9), in accordance with an aspect of the present invention.

FIG. 2 depicts XRD patterns of (a) as-synthesized parent material OTBN (indexed to the standard reflections of AlOOH (JCPDS 21-1307)), (b) nanoscale aluminum hydroxide coated OTBN (ratio of Al content in shell to Al content in OTBN=0.45) and (c) nanoscale aluminum hydroxide coated on OTBN (ratio of Al content in shell to Al content in OTBN=0.9), in accordance with an aspect of the present invention. The as-synthesized core composition showed peaks corresponding to (020), (120), (013), (200) (231) and (251) planes (FIG. 2, curve a). The peaks can be indexed as orthorhombic-MOH (JCPDS 21-1307). XRD pattern of nanoscale aluminum hydroxide coated OTBN is shown in FIG. 2b. Two major changes are observed in the patterns of OTBN and nanoscale aluminum hydroxide coated OTBN. Peaks indexed to (031) and (200) have broadened and therefore merged; as are the peaks indexed to (231) and (251). Peak broadening may be interpreted as decreasing crystallite size and reduction in crystalline behavior of the material. The first possibility indicates the formation of a thin nanoscale shell on the surface of OTBN, wherein the particle size is extremely small. It is also possible that nanoscale shell may be amorphous in nature and due to its surface coverage, the crystalline features of OTBN are not pronounced. With the increasing percentage of nanoscale shell, the crystalline features are even further masked, which indicates that nanoscale shell is amorphous in nature.

Figure 3:
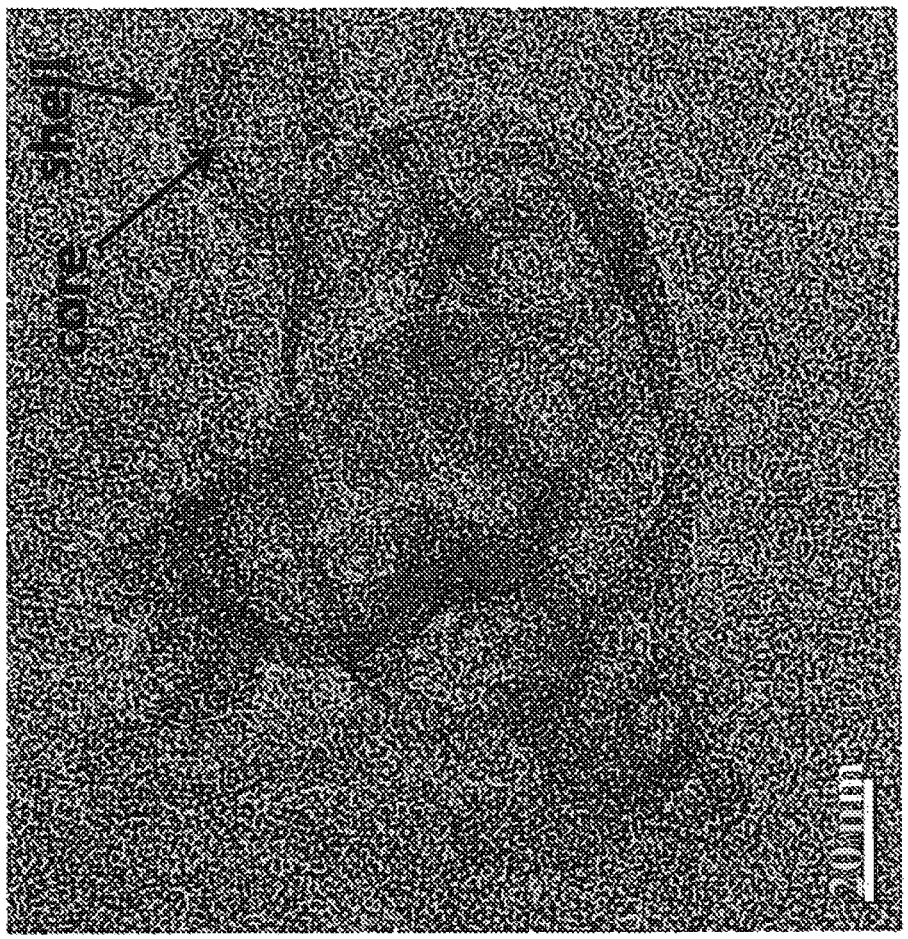
FIG. 3 depicts TEM image of nanoscale aluminum hydroxide coated on OTBN, in accordance with an aspect of the present invention.

FIG. 3 depicts TEM image of nanoscale aluminum hydroxide coated on OTBN, in accordance with an aspect of the present invention. The formation of nanoscale shell on OTBN is evident from the images. It appears that nanoscale shell has encapsulated more than one particle. Individual OTBN particles can be observed in the images. The contrast between OTBN and nanoscale shell may be due to the differences in the focal plane.

Figure 4:
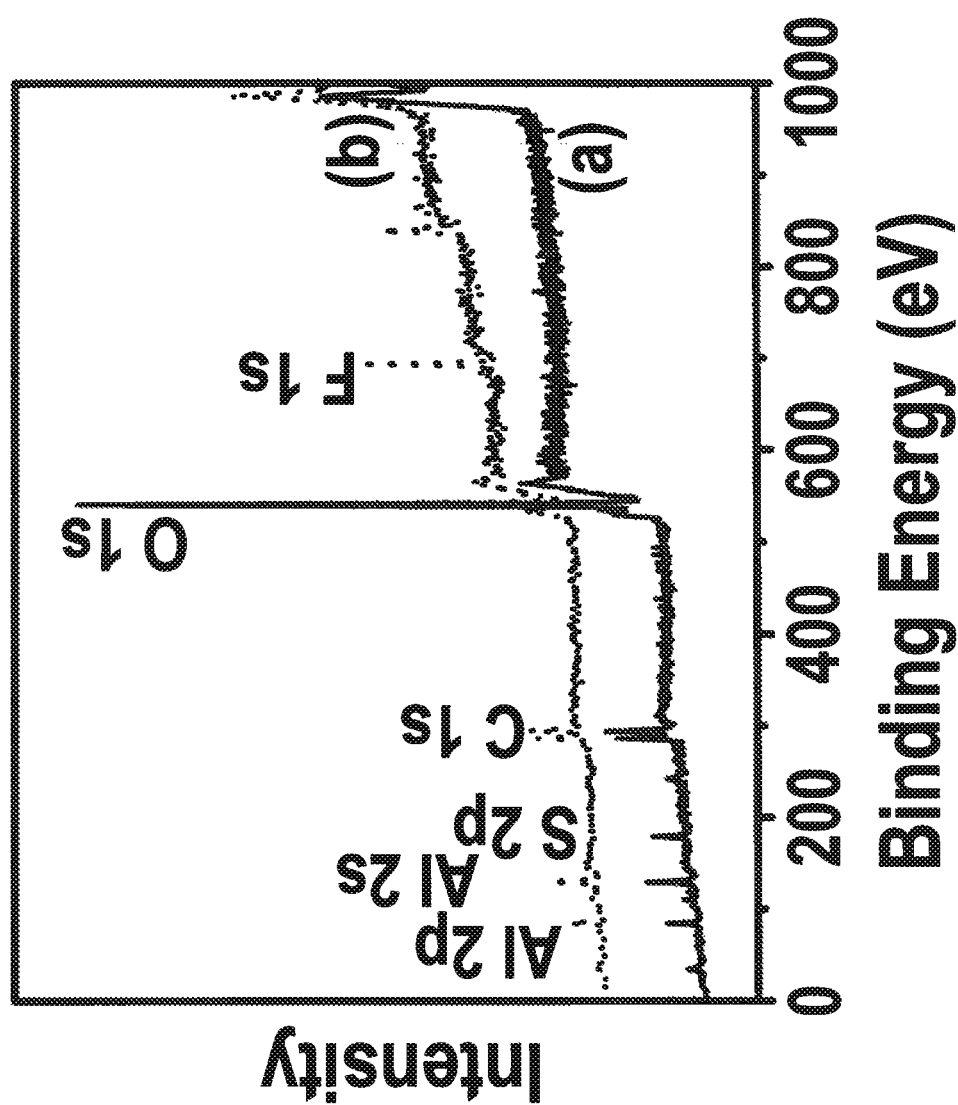
FIG. 4 depicts XPS survey spectra of (a) nanoscale aluminum hydroxide coated OTBN and (b) nanoscale aluminum hydroxide coated OTBN exposed to 100 mg/L fluoride that confirms the existence of adsorbed fluoride along with disappearance of sulfate ion in the F⁻ treated composition, in accordance with an aspect of the present invention.
Figure 5:
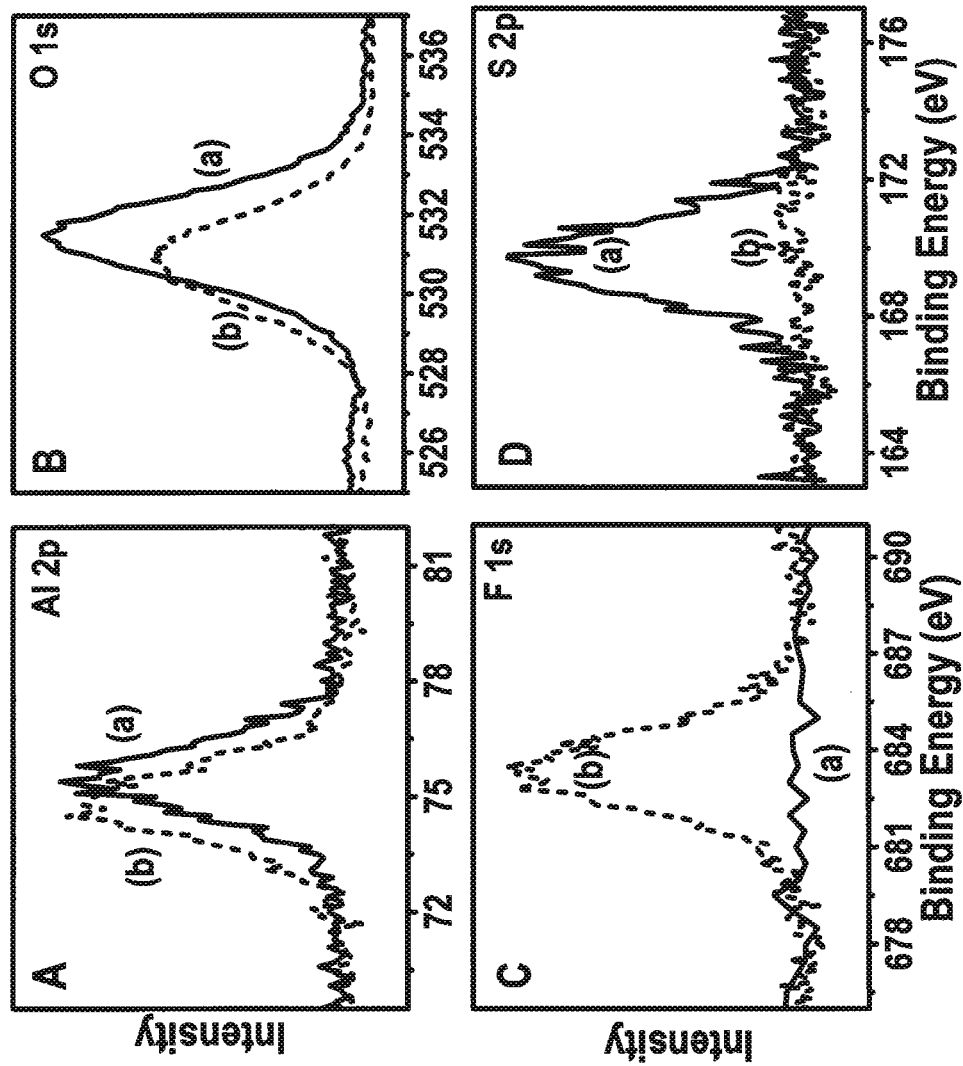
FIG. 5 depicts XPS spectra of (A) Al 2p, (B) O 1s, (C) F 1s and (D) S 2p, for adsorbent composition (a) before and (b) after exposure to 100 mg/L fluoride, in accordance with an aspect of the present invention.

FIG. 4 depicts XPS survey spectra of (a) nanoscale aluminum hydroxide coated OTBN and (b) nanoscale aluminum hydroxide coated OTBN exposed to 100 mg/L fluoride that confirms the existence of adsorbed fluoride along with disappearance of sulfate ion in the F− treated composition, in accordance with an aspect of the present invention. To understand the chemical changes in the composition upon adsorption of fluoride, detailed scans of specific regions of key elements (Al, 2p, O 1s, F 1s, S 2p) were carried out. FIG. 5 shows the corresponding spectra of various regions of interest. These spectra confirm the existence of adsorbed fluoride along with the key elements, aluminum and oxygen. The XPS spectrum of aluminum 2p level shows a peak at 75.5 eV. Fluoride adsorption leads to a mild shift in the position of aluminum and it appears at lower binding energy; simultaneously a reduction in the surface positive charge is seen in oxygen, as a result of which 1s appears at a lower binding energy, with reduced intensity. Reduction in the intensity may be attributed to the loss of sulfate ion upon fluoride adsorption.

Sulfur is completely eliminated from the composition upon fluoride adsorption, indicating that the fluoride ion replaces the sulfate from the binding sites. Presence of sulfate is due to the use of aluminum sulfate as metal precursor and sulfate ions adsorb on the surface of aluminum hydroxide. We propose that sulfate plays an important role in protecting the sites of adsorbent composition; due to the presence of sulfate ion, other interfering ions with lower preference (such as chloride, nitrate, etc.) do not absorb on the surface. While the number of surface sites available on the adsorbent surface is fixed and limited, there is always a competition between various ions usually found in water. Typically, the occupation of sites by various ions depends on preference for adsorption and ion concentration. Ions, such as fluoride and arsenic typically have high preference but are found in low preference. Therefore, it is important to protect the surface sites to obtain maximum adsorption capacity. In the adsorbent composition of the present invention, this is accomplished by adsorption of sulfate ions on the surface sites. Sulfate ions are easily replaced by fluoride ions due to higher preference and therefore the adsorbent composition exhibits high fluoride adsorption capacity.

Figure 6:
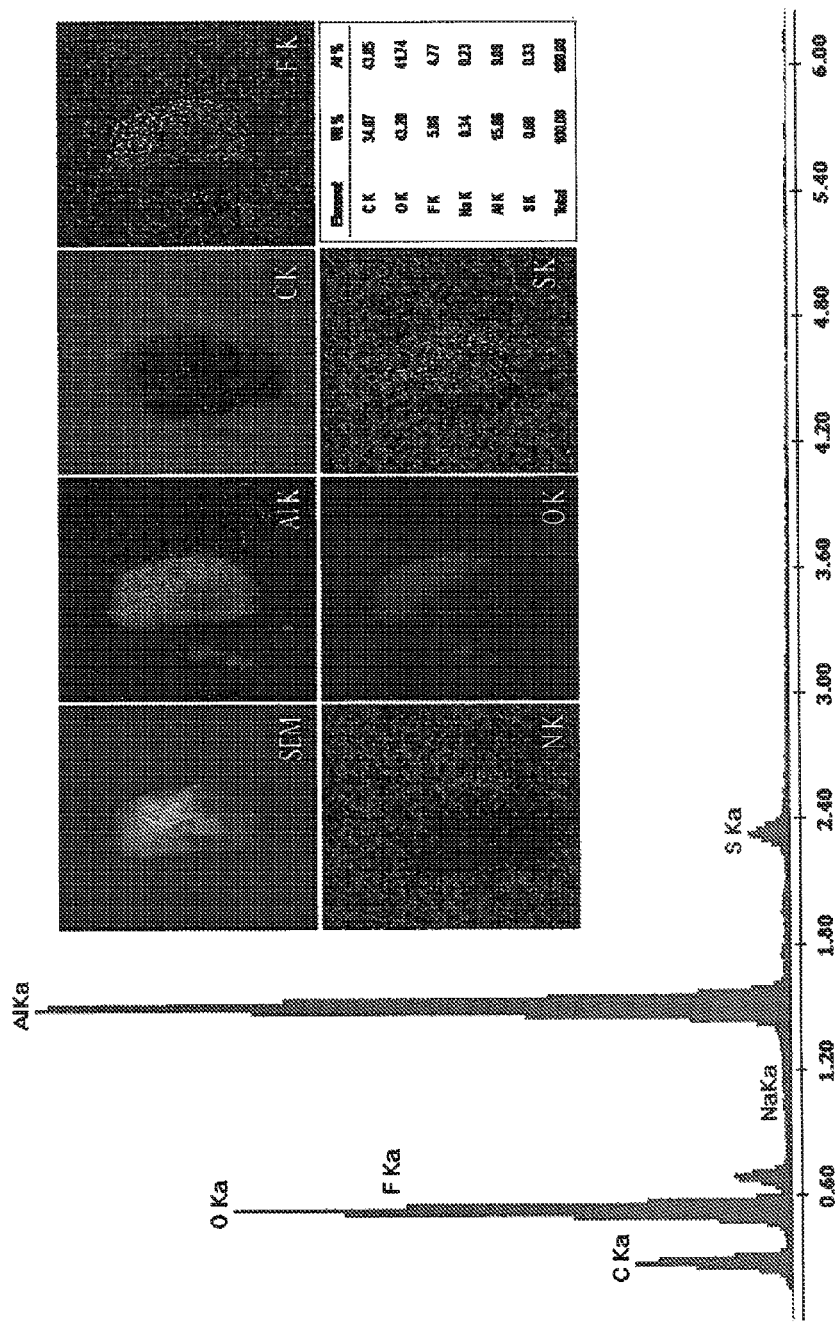
FIG. 6 depicts EDAX spectrum of nanoscale aluminum hydroxide coated OTBN, wherein the inset shows elemental Xray images of Al Kα, O Kα, C Kα and S Kα of the sample, corresponding SEM image, and elemental quantification, in accordance with an aspect of the present invention.
Figure 7:
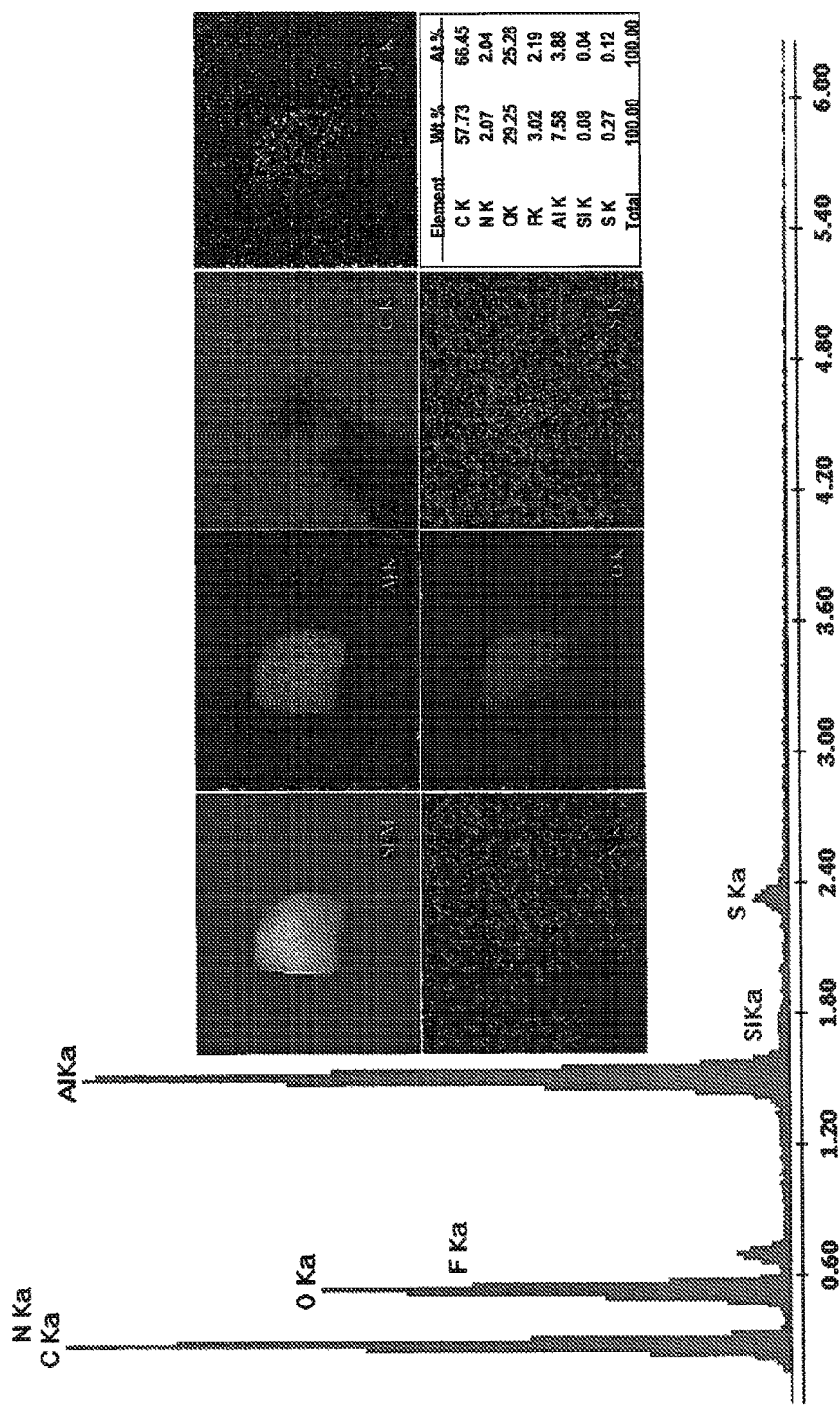
FIG. 7 depicts EDAX spectrum of nanoscale aluminum hydroxide coated OTBN after exposure to 100 mg/L fluoride with 5 mg adsorbent dose (in deionized water), wherein the inset shows elemental X-ray images of Al Kα, O Kα, C Kα, F Kα and S Kα of the sample, corresponding SEM image, and elemental quantification, in accordance with an aspect of the present invention.

FIG. 6 depicts EDAX spectrum of nanoscale aluminum hydroxide coated OTBN, wherein the inset shows elemental X-ray images of Al Kα, O Kα, C Kα and S Kα of the sample, corresponding SEM image, and elemental quantification, in accordance with an aspect of the present invention. The $SO_4^{2-}$ content in the composition is more than 15% (5% sulfur content). The adsorbed sulfate gets replaced with fluoride. This is reflected in FIG. 7 which depicts the corresponding data for nanoscale aluminum hydroxide coated OTBN upon fluoride adsorption (F-concentration=10 ppm). Fluoride concentration in the adsorbed composition is more than 5%, whereas sulfur concentration is reduced to less than 1%. It is observed that the adsorbed fluoride concentration is excessively high and considering that it is observed at low input fluoride concentration, the composition is highly promising for fluoride removal.

Figure 8:
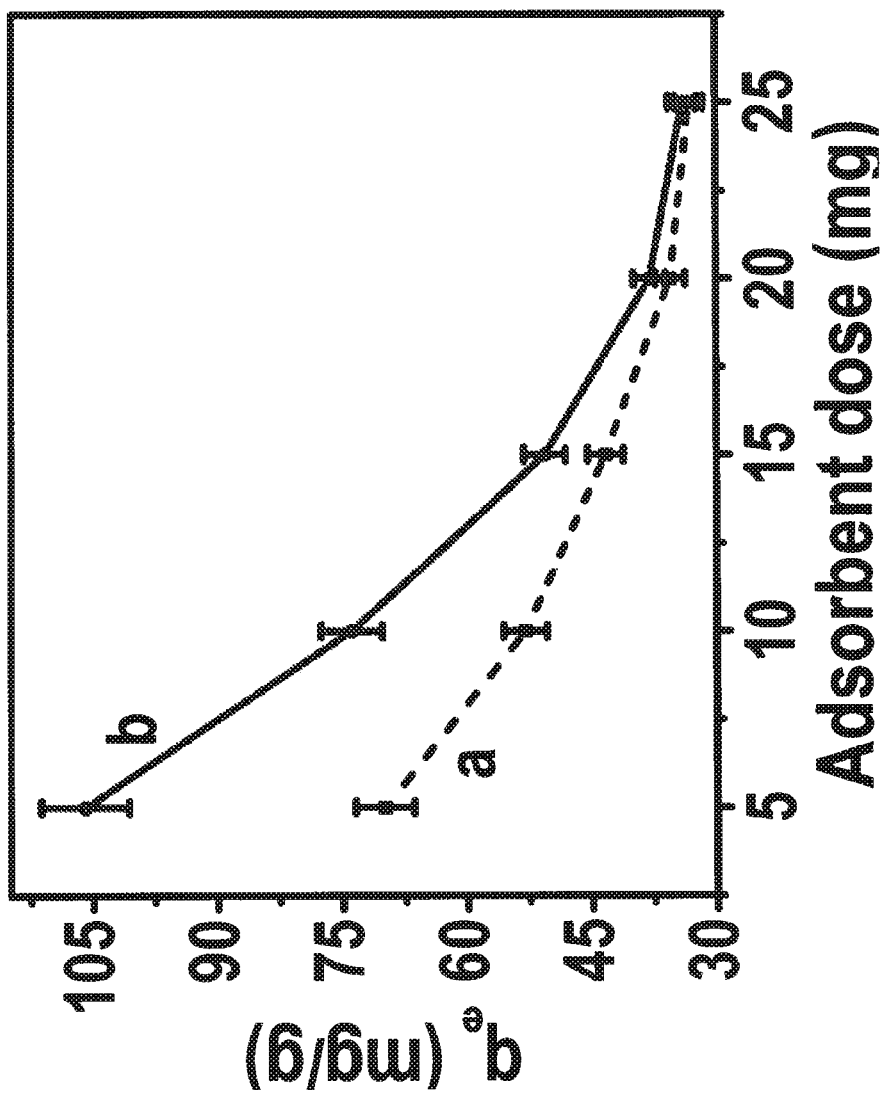
FIG. 8 depicts (a) adsorption capacity of OTBN, and (b) adsorption capacity of nanoscale aluminum hydroxide coated OTBN as function of adsorbent dose in de-ionized water (initial fluoride concentration=10 mg/L), in accordance with an aspect of the present invention.

FIG. 8 depicts (a) adsorption capacity of OTBN, and (b) adsorption capacity of nanoscale aluminum hydroxide coated OTBN as function of adsorbent dose in deionized water (initial fluoride concentration=10 mg/L), in accordance with an aspect of the present invention. The working volume of the contaminated water was taken to be 100 mL and the quantity of adsorbent dose was varied between 5 mg to 25 mg. It is clear that nanoscale aluminum hydroxide coated OTBN has a significant improvement in the performance vis-à-vis OTBN. This was highlighted more significantly in the case when low adsorbent dose was used. It is expected that as the adsorbent dose increases, the concentration of fluoride in water decreases. The variation in capacity with adsorbent dose is minimal at higher doses because residual fluoride concentration is very less.

At the adsorbent dose of 5 mg, the composition of the present invention has fluoride adsorption capacity of 105 mg/g whereas OTBN has a fluoride adsorption capacity of 67 mg/g. This is not only a significant improvement in the fluoride adsorption capacity of aluminum based compounds, but it is also considerably higher than the adsorption capacity of OTBN.

Figure 9:
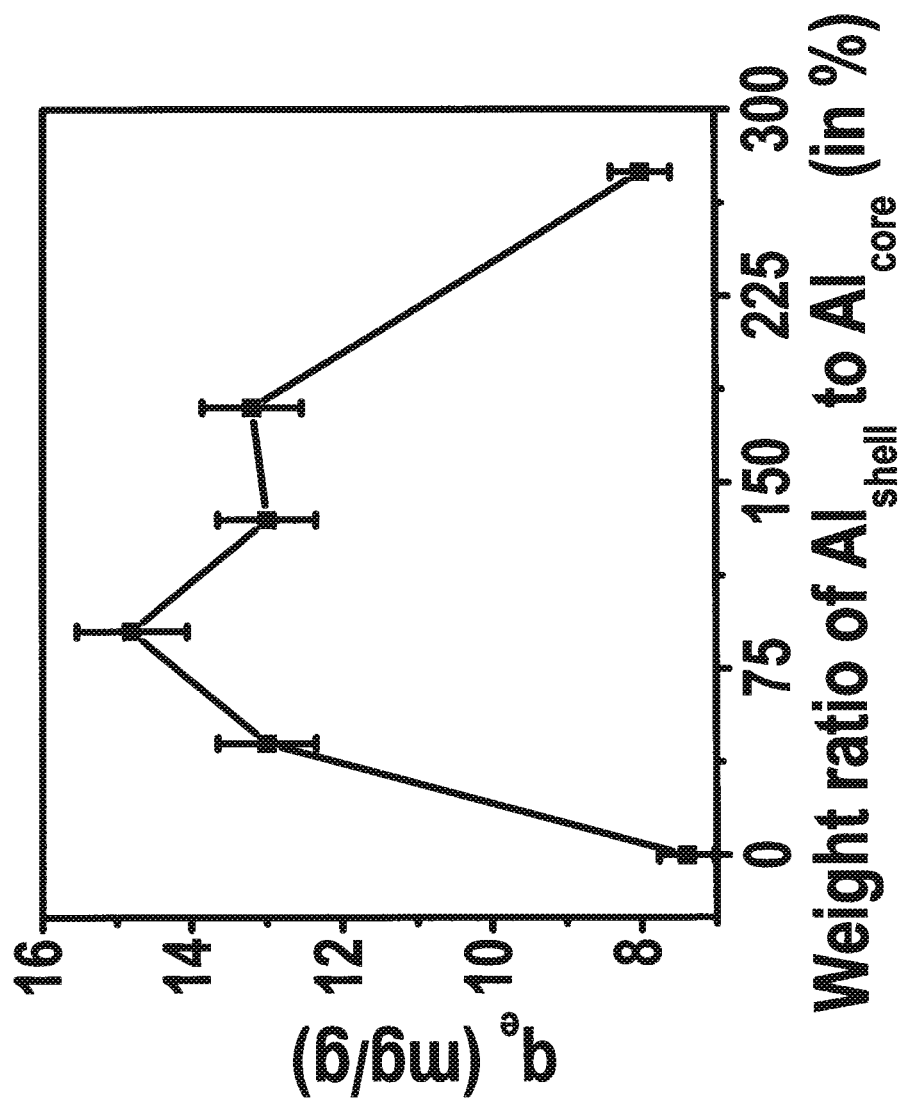
FIG. 9 depicts adsorption capacity of nanoscale aluminum hydroxide coated OTBN as a function of varying aluminum content in nanoscale shell vis-à-vis aluminum content in the core (initial fluoride concentration=10 mg/L, ground water), in accordance with an aspect of the present invention.

FIG. 9 depicts adsorption capacity of nanoscale aluminum hydroxide coated OTBN as a function of varying aluminum content in nanoscale shell vis-à-vis aluminum content in the core (initial fluoride concentration=10 mg/L, ground water), in accordance with an aspect of the present invention. The studies were conducted in ground water spiked with initial fluoride concentration of 10 mg/L. pH of the ground water was measured to be 7.8 and conductivity to be 640 µS/cm. Table (A) below shows the ion analysis of ground water (after spiking with fluoride):

TABLE (A)

| Ion analysis of ground water | | | |
|---|---|---|---|
| Ion | Concentration | Ion | Concentration |
| Fluoride | 10.6 ppm | Sodium | 53.7 ppm |
| Chloride | 86.4 ppm | Potassium | 2.33 ppm |
| Nitrate | 1.84 ppm | Magnesium | 14.34 ppm |
| Sulfate | 32.4 ppm | Calcium | 28.7 ppm |
| Silicate | 15.9 ppm | | |

The core composition (OTBN, shell percentage=0%) showed fluoride adsorption capacity of 7.5 mg/g in ground water. The decrease in the fluoride adsorption capacity in ground water is due to the higher pH, which is known to reduce the capacity of aluminum based compounds and the presence of interfering anions such as silicate. Increasing the thickness of nanoscale shell (expressed as ratio of weight of Al in shell to weight of Al in core) increases the fluoride adsorption capacity and a maximum is reached at a weight ratio of $Al_{shell}:Al_{core}$ of 90%. Observed fluoride adsorption capacity is 15 mg/g. Upon further increase in the shell thickness, fluoride adsorption capacity eventually decreases. Hence, the optimum shell thickness is noted for a weight ratio of $Al_{shell}:Al_{core}$ at 90%.

In an aspect of the present invention, a method for preparing an adsorbent composition is provided. A nanoscale layer of at least one of a metal oxyhydroxide, a metal hydroxide, and a metal oxide is formed on an organic-templated-boehmite-nanoarchitecture (OTBN). The particle size of the nanoscale layer is less than about 3 nanometers. The adsorbent composition is used for removal of a fluoride from drinking water. The method further includes hydrolysis of a metal precursor by using an alkaline medium. The metal precursor is contacted with OTBN, whereby a metal ion-OTBN complex is formed, which is contacted with a base. The precipitate formed is filtered, washed and dried.

In another aspect, a water purification system that includes a filter prepared by the method of the present invention is provided. The filter can be realized in the form of a candle, a molded porous block, a filter bed, a column, a packet, a sachet, and a bag. A skilled artisan will appreciate that such forms of filters are well known in the art and their description has been omitted so as not to obfuscate the present invention.

The described aspects are illustrative of the invention and not restrictive. It is therefore obvious that any modifications described in this invention, employing the principles of this invention without departing from its spirit or essential characteristics, still fall within the scope of the invention. Consequently, modifications of design, methods, structure, sequence, materials and the like would be apparent to those skilled in the art, yet still fall within the scope of the invention.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for preparing an adsorbent composition, the method comprising:
forming a nanoscale layer of at least one of a metal oxyhydroxide, a metal hydroxide, and a metal oxide on an organic-templated-boehmite-nanoarchitecture (OTBN), wherein the at least one metal oxyhydroxide, metal hydroxide, or metal oxide forms a shell on the OTBN, and wherein a particle size of the nanoscale layer is less than about 3 nanometers, whereby the adsorbent composition is used for removal of a fluoride from drinking water.

2. The method of claim 1 further comprising hydrolyzing a metal precursor by using an alkaline medium.

3. The method of claim 2, wherein the metal precursor comprises at least one of a salt of aluminum, iron, titanium, manganese, cobalt, nickel, copper, silver, zinc, lanthanum, cerium, zirconium, calcium, magnesium, barium, and combinations thereof.

4. The method of claim 2, wherein the metal precursor comprises aluminum sulfate.

5. The method of claim 2, wherein the metal precursor comprises at least one of aluminum nitrate, aluminum chloride, aluminum isopropoxide, aluminum acetate, and combinations thereof.

6. The method of claim 2, wherein the step of forming the nanoscale layer comprises:
contacting the metal precursor with OTBN, whereby a metal ion-OTBN complex is formed; and
contacting the metal ion-OTBN complex with a base, whereby the nanoscale layer of at least one of the metal oxyhydroxide, the metal hydroxide, and the metal oxide on the OTBN is formed.

7. The method of claim 6 further comprising filtering and washing a precipitate formed with water.

8. The method of claim 7 further comprising drying the filtered and washed precipitate to remove moisture content, wherein drying is performed at temperatures below about 60° C., whereby a first material is formed.

9. The method of claim 8, wherein the drying includes at least one of air drying and sun drying.

10. The method of claim 8 further comprising grinding the first material, whereby particles in granular form are formed.

11. The method of claim 6, wherein the base comprises at least one of sodium hydroxide, potassium hydroxide, ammonia, and combinations thereof.

12. The method of claim 1, wherein the adsorbent composition is used for removal of at least one of a fluoride and an arsenic from the drinking water having a fluoride adsorption capacity in greater than about 100 mg/g at an initial fluoride concentration of about 10 mg/L.

13. The method of claim 1, wherein the OTBN is in form of a homogeneous aqueous dispersion, water-insoluble granules suspended in aqueous medium, and combinations thereof.

14. The method of claim 1, wherein a thickness of the nanoscale layer is in the range of about 1 nm to about 10 nm.

15. The method of claim 1 further comprising hydrolyzing a non-metal precursor by using an alkaline medium in presence of the OTBN.

16. The method of claim 15, wherein the non-metal precursor comprises at least one of a salt of silicon, germanium, tellurium, gallium, indium, and combinations thereof.

17. The method of claim 1 further comprising hydrolyzing an acid soluble biopolymer by using an alkaline medium in presence of the OTBN.

18. The method of claim 17, wherein the acid soluble biopolymer comprises at least one of chitosan, nylon, and combinations thereof.

19. The method of claim 1, wherein the adsorbent composition is used in form of at least one of a candle, a molded porous block, a filter bed, a column, a packet, a sachet and a bag.

* * * * *